(12) United States Patent
Suh

(10) Patent No.: US 10,698,269 B2
(45) Date of Patent: Jun. 30, 2020

(54) LIQUID CRYSTAL DISPLAY DEVICE AND METHOD OF MANUFACTURING THE SAME

(71) Applicant: Samsung Display Co. Ltd., Yongin-si, Gyeonggi-do (KR)

(72) Inventor: Duck Jong Suh, Gwangmyeong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 194 days.

(21) Appl. No.: 15/865,837

(22) Filed: Jan. 9, 2018

(65) Prior Publication Data
US 2019/0041674 A1 Feb. 7, 2019

(30) Foreign Application Priority Data

Aug. 4, 2017 (KR) .................. 10-2017-0098935

(51) Int. Cl.
*G02F 1/1343* (2006.01)
*G02F 1/135* (2006.01)
(Continued)

(52) U.S. Cl.
CPC ............ *G02F 1/1343* (2013.01); *G02F 1/135* (2013.01); *G02F 1/1337* (2013.01);
(Continued)

(58) Field of Classification Search
CPC ............ G02F 1/1343; G02F 1/133509; G02F 1/1337; G02F 1/133711; G02F 1/135; G02F 1/13475; G02F 1/13737; G02F 1/133703; G02F 1/13725; C09K 19/60; C09K 19/601; C09K 19/603
See application file for complete search history.

(56) References Cited

U.S. PATENT DOCUMENTS

2002/0098295 A1* 7/2002 Yip .................. G02F 1/133788
427/487
2016/0306232 A1* 10/2016 Oh ..................... G02F 1/133711
2018/0208848 A1* 7/2018 Archetti ............... C09K 19/066

FOREIGN PATENT DOCUMENTS

JP 2014043555 A 3/2014
KR 1020160076647 A 7/2016
(Continued)

OTHER PUBLICATIONS

Kundu et al., "In Situ Homeotropic Alignment of Nematic Liquid Crystals Based on Photoisomerization of Azo-Dye, Physical Adsorption of Aggregates, and Consequent Topographical Modification", 2013, Advanced Materials, 25, 3365-3370. (Year: 2013).*
(Continued)

*Primary Examiner* — Cynthia H Kelly
*Assistant Examiner* — Anna Malloy
(74) *Attorney, Agent, or Firm* — Cantor Colburn LLP

(57) ABSTRACT

A liquid crystal display device includes: a first base substrate; a first electric field generating electrode disposed on the first base substrate; a liquid crystal layer disposed on the first electric field generating electrode and including liquid crystals; and a first wavelength absorbing layer disposed between the first electric field generating electrode and the liquid crystal layer, and configured to absorb a portion of an incident light wavelength.

17 Claims, 29 Drawing Sheets

(51) Int. Cl.
   *G02F 1/1337*   (2006.01)
   *G02F 1/1335*   (2006.01)
   *G02F 1/13357*  (2006.01)

(52) U.S. Cl.
   CPC .. *G02F 1/133509* (2013.01); *G02F 1/133711* (2013.01); *G02F 2001/1351* (2013.01); *G02F 2001/133614* (2013.01)

(56) References Cited

FOREIGN PATENT DOCUMENTS

| KR | 1020170005775 A | 1/2017 |
| KR | 1020170032868 A | 3/2017 |

OTHER PUBLICATIONS

Vengatesan et al., "In situ self-assembled photo-switchable liquid crystal alignment layer using azosilane monomer-liquid crystal mixture system", 2013, Liquid Crystals, vol. 40 No. 9, 1227-1237. (Year: 2013).*

* cited by examiner

LIQUID CRYSTAL DISPLAY DEVICE AND METHOD OF MANUFACTURING THE SAME

This application claims priority to Korean Patent Application No. 10-2017-0098935, filed on Aug. 4, 2017, in the Korean Intellectual Property Office, and all the benefits accruing therefrom under 35 U.S.C. § 119, the content of which in its entirety is herein incorporated by reference.

BACKGROUND

1. Field

The present invention relates to a liquid crystal display device and a method of manufacturing the same.

2. Description of the Related Art

The importance of a display device has increased with the development of multimedia devices. Accordingly, various types of display devices have been used, for example, a liquid crystal display (LCD) and an organic light-emitting display (OLED).

A liquid crystal display device includes a display panel including electric field generating electrodes, such as a pixel electrode and a common electrode, a liquid crystal layer and a backlight unit providing light to the display panel. In the liquid crystal display device, a voltage is applied to the electric field generating electrodes to generate an electric field and rearrange liquid crystals in the liquid crystal layer, and thus the amount of light transmitted by the liquid crystal layer for each pixel is controlled, thereby realizing an image display.

There remains a need for an improved liquid crystal display device having improved light transmission properties.

SUMMARY

Methods for allowing each pixel to uniquely express a basic color have been developed, for example, a method of arranging color conversion patterns using, for example, color filters for each pixel in a light path from the backlight unit to a viewer. The color filter absorbs a portion of a wavelength band of incident light, and selectively transmits only a portion of the light of the wavelength band, thereby realizing the transmission of basic colors. In this case, as the wavelength spectrum of the light transmitted by the color filter becomes closer to the peak wavelength of each basic color, more accurate color realization is possible. However, there is a limitation in that the wavelength spectrum of the light is narrowed after passing through the color filter.

Accordingly, in order to solve the above problem, an aspect of the present invention is to provide a liquid crystal display device having improved color reproducibility.

Another aspect of the present invention is to provide a method of manufacturing a liquid crystal display device having improved color reproducibility.

According to an exemplary embodiment of the invention, a liquid crystal display device includes: a first base substrate; a first electric field generating electrode disposed on the first base substrate; a liquid crystal layer disposed on the first electric field generating electrode and including liquid crystals; and a first wavelength absorbing layer disposed between the first electric field generating electrode and the liquid crystal layer, and configured to absorb a portion of an incident light wavelength.

In an exemplary embodiment, the first wavelength absorbing layer may be in contact with the liquid crystal layer and the first electric field generating electrode, and the first wavelength absorbing layer may be configured to induce initial alignment of the liquid crystals.

In an exemplary embodiment, the first wavelength absorbing layer may include a first compound or a polymer of the first compound, wherein the first compound may include a core structure and at least one hydrophilic group bound to an end of the core structure, and the hydrophilic group includes a chromophore.

In an exemplary embodiment, the hydrophilic group may include a porphyrazine chromophore, and the first wavelength absorbing layer may have an absorption peak wavelength in a range of about 580 nanometers (nm) to about 600 nm or in a range of about 490 nm to about 510 nm.

In an exemplary embodiment, the porphyrazine chromophore may be represented by Chemical Formula 2 below.

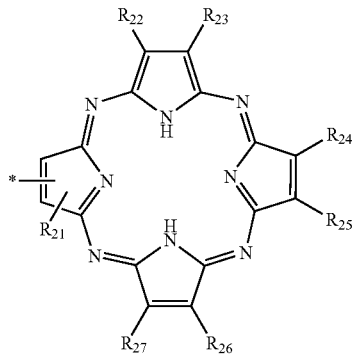

Chemical Formula 2

In Chemical Formula 2 above, $R_{21}$ to $R_{27}$ are each independently a hydrogen atom, a methyl group, or an ethyl group.

In an exemplary embodiment, the core structure may include a quinizarin chromophore or an azo-naphthol chromophore, and the first wavelength absorbing layer may have an absorption peak wavelength in a range of about 580 nm to about 600 nm or in a range of about 475 nm to about 490 nm.

In an exemplary embodiment, the quinizarin chromophore may be represented by Chemical Formula 3 below, and azo-naphthol chromophore may be represented by Chemical Formula 4 below.

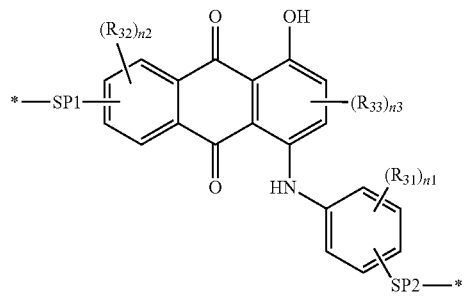

Chemical Formula 3

Chemical Formula 4

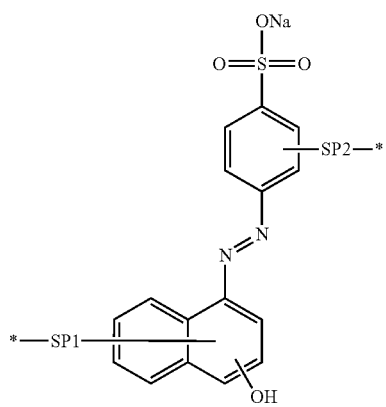

In Chemical Formula 3 above, $R_{31}$ is a methyl group or an ethyl group, $R_{32}$ and $R_{33}$ are each independently a phenyl group, n1 is an integer of 0 to 5, n2 is an integer of 0 to 3, and n3 is an integer of 0 to 2; and in Chemical Formulas 3 and 4 above, SP1 and SP2 are each independently a single bond or a $C_1$-$C_{12}$ alkylene group.

In an exemplary embodiment, the first wavelength absorbing layer may further include: a second compound including a core structure, at least one hydrophilic group bound to an end of the core structure, and a polymerizable group bound to the other end of the core structure; a polymer of the second compound; a third compound including a core structure, at least one hydrophilic group bound to an end of the core structure, and an aliphatic or aromatic hydrocarbon moiety bound to the other end of the core structure; or a polymer of a fourth compound including a core structure and polymerizable groups bound to an end of the core structure and a polymerizable group bound to the other end of the core structure.

In an exemplary embodiment, the hydrophilic group of each of the first compound, the second compound, and the third compound may be aligned toward the first electric field generating electrode, and t the first wavelength absorbing layer is configured to induce vertical alignment of the liquid crystals in the liquid crystal layer.

In an exemplary embodiment, the liquid crystal display device may further comprise: a second base substrate disposed on the liquid crystal layer; a second electric field generating electrode disposed between the second base substrate and the liquid crystal layer and configured to form an electric field together with the first electric field generating electrode; and a second wavelength absorbing layer disposed between the second electric field generating electrode and the liquid crystal layer, and in contact with the second electric field generating electrode and the liquid crystal layer, wherein the second wavelength absorbing layer is configured to absorb substantially a same incident light wavelength as the first wavelength absorbing layer.

In an exemplary embodiment, the liquid crystal display device may further comprise: a second base substrate disposed on the liquid crystal layer; a second electric field generating electrode disposed between the second base substrate and the liquid crystal layer and configured to form an electric field together with the first electric field generating electrode; and a liquid crystal alignment layer disposed between the second electric field generating electrode and the liquid crystal layer, and in contact with the second electric field generating electrode, and wherein the liquid crystal alignment layer includes a polyimide polymer, wherein a side of the second base substrate facing the first base substrate may be concave.

In an exemplary embodiment, a surface roughness of the first wavelength absorbing layer may be lower than a surface roughness of the liquid crystal alignment layer.

In an exemplary embodiment, the liquid crystal display device may further comprise: a backlight unit configured to provide light, wherein light provided from the backlight unit and incident on the first wavelength absorbing layer may include light having a peak wavelength in a wavelength band of about 430 nm to about 480 nm, light having a peak wavelength in a wavelength band of about 530 nm to about 570 nm, and light having a peak wavelength in a wavelength band of about 610 nm to about 650 nm.

In an exemplary embodiment, the liquid crystal display device may further comprise: a color conversion pattern layer disposed between the first base substrate and the first electric field generating electrode, wherein the color conversion pattern layer has a transmission wavelength band which may overlap an absorption peak wavelength of the portion of the incident light absorbed by first wavelength absorbing layer.

According to an exemplary embodiment of the invention, a method of manufacturing a liquid crystal display device, includes: providing a first substrate including a first base substrate and a first electric field generating electrode disposed on the first base substrate; providing a second substrate including a second base substrate and a second electric field generating electrode disposed on the second base substrate; and providing a liquid crystal composition to form a liquid crystal layer between the first substrate and the second substrate, wherein the liquid crystal composition includes liquid crystals and a first compound including at least one hydrophilic group bound to an end of a core structure, wherein the at least one hydrophilic group comprises a chromophore.

In an exemplary embodiment, wherein the liquid crystal composition may further include: a second compound including at least one hydrophilic group bound to an end of a core structure and a polymerizable group bound to the other end of the core structure; a third compound including at least one hydrophilic group bound to an end of a core structure and an aliphatic or aromatic hydrocarbon moiety bound to the other end of the core structure; or a fourth compound including a polymerizable group bound to an end of the core structure and a polymerizable group bound to the other end of the core structure.

In an exemplary embodiment, the providing of the liquid crystal composition may include contacting the liquid crystal composition with the first electric field generating electrode and the second electric field generating electrode.

In an exemplary embodiment, the method may further include: bending the second substrate such that a side of the second substrate facing the first substrate is concave, wherein the second substrate may further include a polymer layer disposed on the second electric field generating electrode and the polymer layer comprises a polyimide polymer, and the providing the of liquid crystal composition may include contacting the liquid crystal composition with the first electric field generating electrode and the polymer layer.

In an exemplary embodiment, the providing of the liquid crystal composition to form the liquid crystal layer may include: aligning at least a portion of the first compound, a portion of the second compound, and a portion of the third compound on a surface of the first field generating electrode to form a first alignment layer; aligning at least a portion of the first compound, a portion of the second compound, and a portion of the third compound on a surface of the second field generating electrode to form a second alignment layer; and forming the liquid crystal layer including liquid crystals vertically aligned by the first alignment layer and the second alignment layer.

In an exemplary embodiment, the method may further comprise; forming an electric field in the liquid crystal layer; and irradiating a light to the liquid crystal layer while the electric field is present, and polymerizing at least a portion of the first compound, a portion of the second compound, and a portion of the fourth compound.

As described above, the liquid crystal display device according to an embodiment of the present invention may include a wavelength absorbing layer that absorbs a portion of an incident light wavelength, so that only the wavelength band near the peak wavelength of each unique color is transmitted, thereby improving the color reproducibility of the liquid crystal display device. Further, the position of the wavelength absorbing layer is fixed by forming a polymer, thereby preventing the increase in the content of impurities in the liquid crystal layer and minimizing the decrease in the voltage holding ratio of the liquid crystal display device.

Further, in the method of manufacturing a liquid crystal display device according to an embodiment of the present invention, a wavelength absorbing layer that absorbs a portion of the incident light wavelength can be formed by a relatively simple method.

The effects of the present invention are not limited by the foregoing, and other various effects are anticipated herein. However, aspects of the present invention are not restricted to those set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
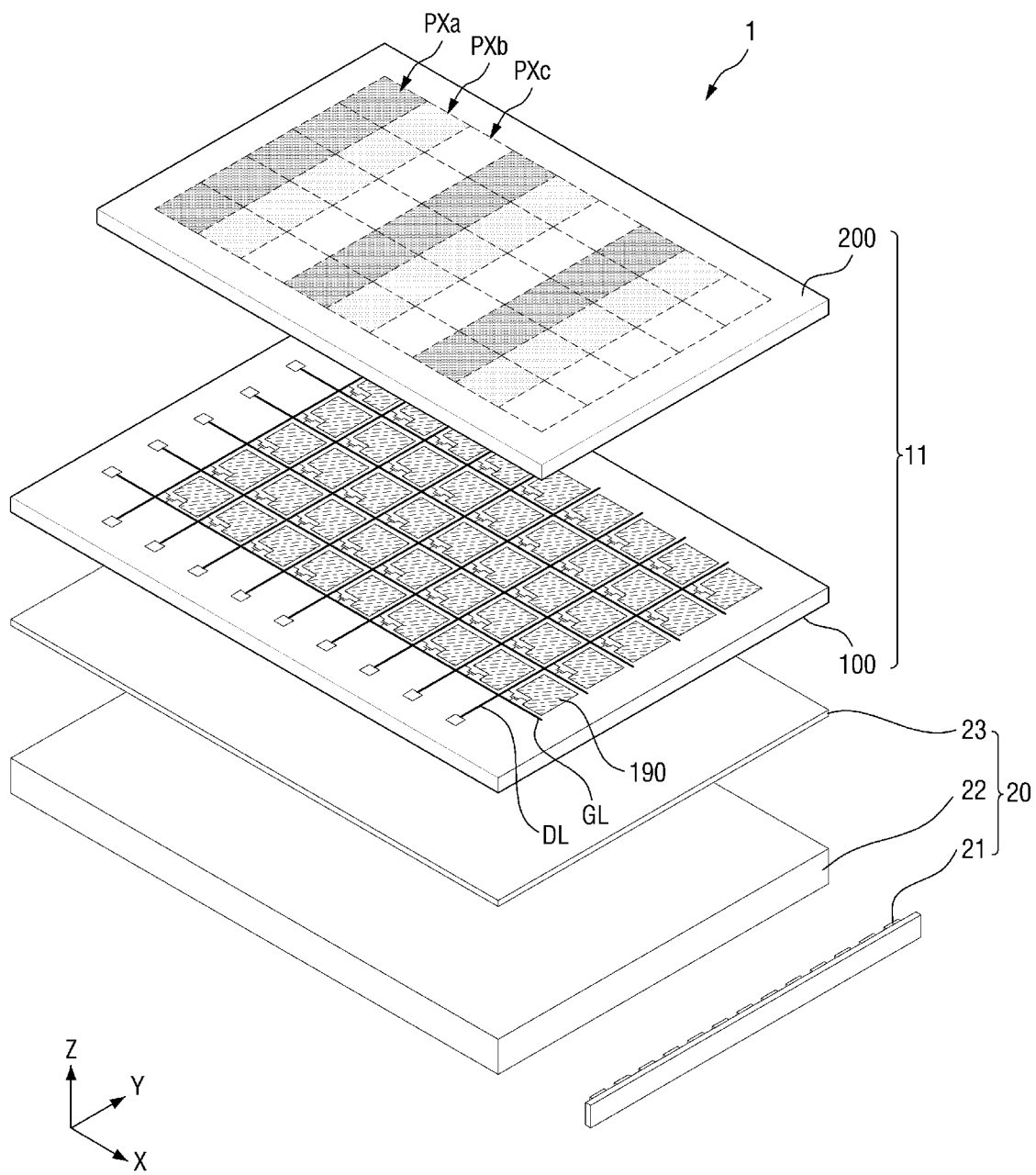
FIG. 1 is an exploded perspective view of a liquid crystal display device according to an embodiment of the present invention.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an" and "the" are intended to include the plural forms as well, including "at least one," unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. "At least one" is not to be construed as limiting "a" or "an." "Or" means "and/or." As used herein, the term "and/or" includes any and all combinations of one or more of the associated listed items.

Hereinafter, embodiments of the present invention will be described with reference to the attached drawings.

Figure 2:
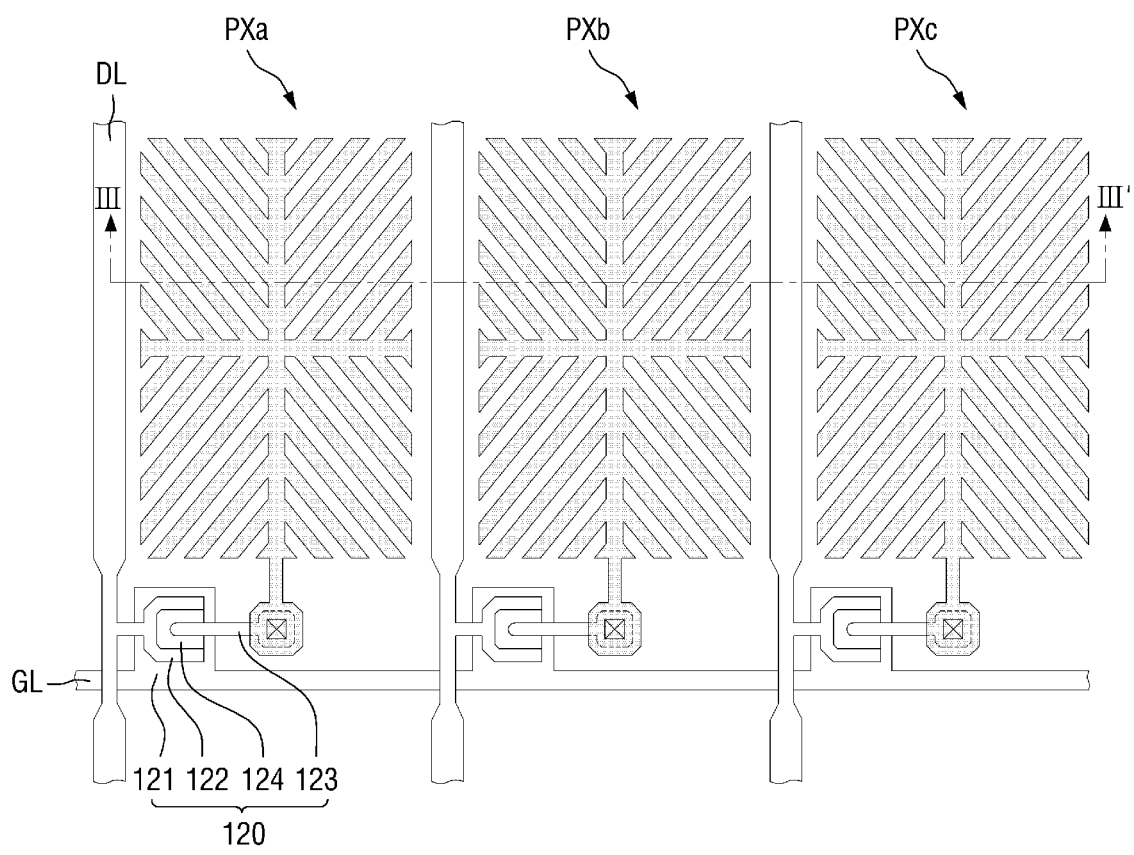
FIG. 2 is a plan view of pixels shown in FIG. 1.
Figure 3:
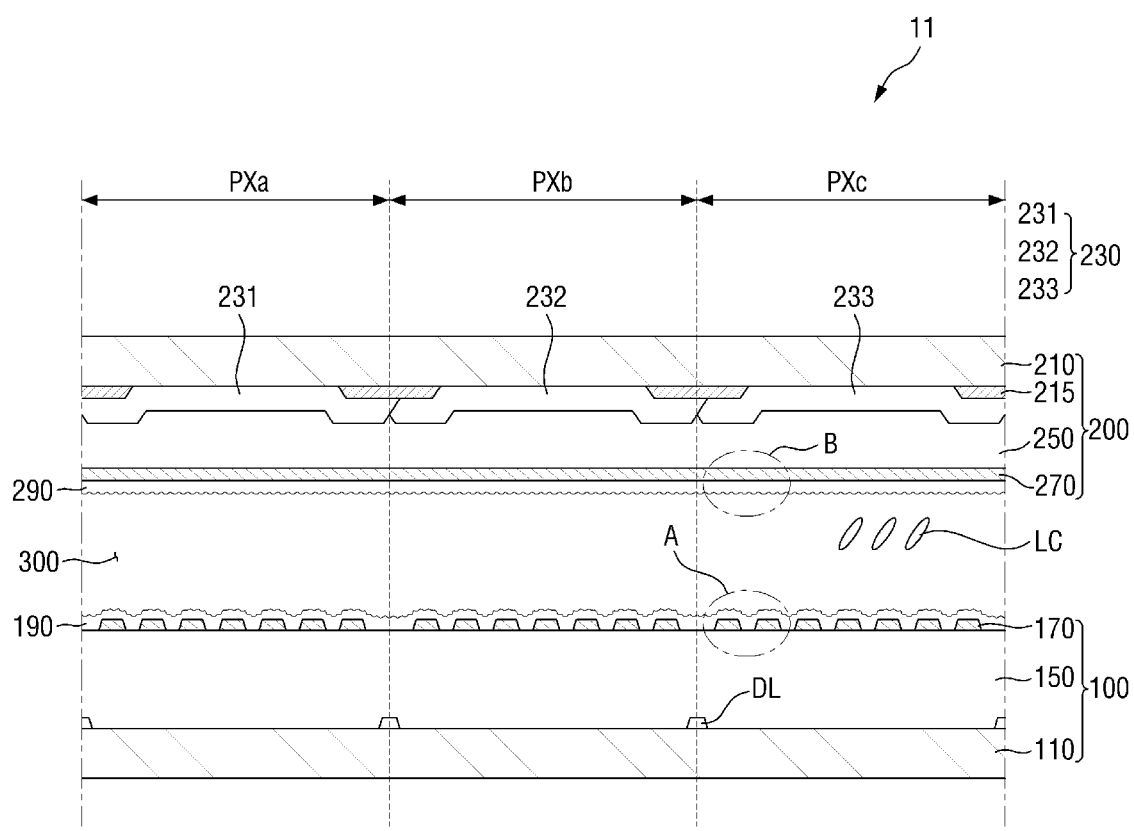
FIG. 3 is a cross-sectional view taken along the line in FIG. 2.

FIG. 1 is an exploded perspective view of a liquid crystal display device according to an embodiment of the present invention. FIG. 2 is a plan view of the pixels shown in FIG. 1. FIG. 3 is a cross-sectional view taken along line in FIG. 2.

Referring to FIGS. 1 to 3, the liquid crystal display device 1 according to this embodiment includes a display panel 11 and a backlight unit 20 configured to provide light to the display panel 11.

The display panel may include a first substrate 100, a second substrate 200, and a liquid crystal layer 300 interposed between the first substrate 100 and the second substrate 200. The liquid crystal layer 300 may be sealed by the first substrate 100, the second substrate 200, and a sealing member (not shown) attaching the first substrate 100 and the second substrate 200.

A plurality of pixels arranged substantially in a matrix form on a plane may be defined in the display panel 11. In this specification, the term "pixel" means a single area defined by dividing a display area at a planar viewpoint for color display, and one pixel can express a predetermined basic color. That is, one pixel may be a minimum unit capable of expressing a color independent of the color expressed by other pixels on the basis of the display panel 11.

The plurality of pixels include a first pixel PXa for displaying a first color, a second pixel PXb for displaying a second color having a peak wavelength which is shorter than the peak wavelength of the first color, and a third pixel PXc for displaying a third color having a peak wavelength shorter than the peak wavelength of the second color. In an exemplary embodiment, the first pixel PXa, the second pixel PXb, and the third pixel PXc sequentially arranged in the first direction (X) constitute a basic unit, and this basic unit is repeated in the first direction (X). The first pixel PXa, the second pixel PXb, and the third pixel PXc may be repeated in the second direction Y, respectively.

For example, the first pixel PXa may be a pixel for displaying a red color having a peak wavelength in a range of about 610 nanometers (nm) to about 650 nm, the second pixel PXb adjacent to the first pixel PXa in the first direction X may be a pixel for displaying a green color having a peak wavelength in a range of about 530 nm to about 570 nm, and the third pixel PXc adjacent to the second pixel PXb in the first direction X may be a pixel for displaying a blue color having a peak wavelength in a range of about 430 nm to about 470 nm, but the present invention is not limited thereto.

The display panel 11 includes a plurality of gate lines GL extending in the first direction X and a plurality of data lines DL extending in the second direction Y and arranged to be insulated from the gate lines GL. The gate line GL and the data line DL may be connected to a driving unit (not shown), respectively, to transmit a driving signal to a first electrode 170 disposed for each of the plurality of pixels.

The backlight unit 20 is disposed under the display panel 11, and may emit light toward the display panel 11. In an exemplary embodiment, the backlight unit 20 may provide light including light having a peak wavelength of the first color, light having a peak wavelength of the second color, and light having a peak wavelength of the third color. For example, the backlight unit 20 may emit white light including light in the red wavelength band (region), light in the green wavelength band, and light in the blue wavelength band.

The backlight unit 20 may include a light source 21 directly emitting light, a light guide plate 22 guiding the path of light emitted from the light source 21, and a wavelength conversion layer 23 disposed on the light guide plate 22.

The light source 21 may be a light emitting diode that emits light having a shorter peak wavelength than the peak wavelength of the first color and the peak wavelength of the second color, for example, blue light or ultraviolet light. The light guide plate 22 may guide (e.g., reflect) the light emitted from the light source 21 and may emit the light toward the display panel 11. For example, the side surface of the light guide plate 22 adjacent to the light source 21 may be a light incidence surface, and the upper surface of the light guide plate 22 facing the display panel 11 may be a light exit surface. The light guide plate 22 is not particularly limited as long as it is made of a material having high light transmittance in order to guide the light emitted from the light source 21 without loss. For example, the light guide plate 22 may be made of plastic or glass. Although FIG. 1 illustrates an edge type backlight unit, the present invention is not limited thereto, and in other embodiments, it may be a direct-type backlight unit.

The wavelength conversion layer 23 may convert or shift the wavelength of incident light. The wavelength conversion layer 23 may include a base resin and a wavelength shift material dispersed in the base resin, and may further include light scattering particles dispersed in the base resin.

The base resin is a medium in which the wavelength shift material is dispersed, and is not particularly limited as long as it is a material having high light transmittance and good dispersion properties with respect to the wavelength shift material.

The wavelength shift material may convert or shift the peak wavelength of incident light into a specific peak wavelength. Examples of the wavelength shift material include quantum dots, quantum rods, and fluorescent materials. For example, when quantum dots absorb light having a wavelength of high energy, electrons are transited from a conduction band to a valence band to emit light of a specific color. The quantum dot may have a core-shell structure. The core may be a semiconductor nanocrystalline material. Examples of the core of the quantum dot may include a silicon (Si) nanocrystal, a Group 2-Group 6 compound nanocrystal, and Group 3-Group 5 compound nanocrystal, but the present invention is not limited thereto.

In an exemplary example, the wavelength conversion layer 23 may contain a plurality of wavelength shift materials having different sizes from each other. For example, the wavelength conversion layer 23 may contain a first wavelength shift material having a particle diameter of about 55 angstroms (Å) to about 65 Å and a second wavelength shift material having a particle diameter of about 40 Å to about 50 Å. The first wavelength shift material may absorb light of a wavelength having high energy and may emit light having a peak wavelength of the first color. The second wavelength shift material may absorb light of a wavelength having high energy and may emit light having a peak wavelength of the second color. The blue light emitted upwards from the light guide plate 22 may be transmitted to the wavelength conversion layer 23. At least a portion of the blue light is converted into red light having a peak wavelength in a wavelength band of about 610 nm to about 650 nm by the first wavelength shift material, and at least a portion of blue light is converted into green light having a wavelength band of about 530 nm to about 570 nm by the second wavelength shift material. Further, at least a portion of the blue light may be directly transmitted to the base resin without wavelength conversion by the wavelength shift material. The blue light incident on the wavelength conversion layer 23 through the above-described process may be converted into white light including the red peak wavelength, the green peak wavelength, and the blue peak wavelength after passing through the wavelength conversion layer 23.

As the basic color expressed by the liquid crystal display device 1 within a perceptive color range, for example, a CIE 1931 coordinate, is located near the vertex of a color standard coordinate triangle, the liquid crystal display device 1 may express a clearer color. That is, when the basic color expressed by the liquid crystal display device 1 has an intrinsic peak wavelength having a narrower full width at half maximum (FWHM), the color purity and color reproducibility of the liquid crystal display device 1 can be improved.

The light emitted by each of the first wavelength shift material and the second wavelength shift material may have a small full width at half maximum and may have strong intensity. The light of a red wavelength and the light of a green wavelength emitted by the first wavelength shift material and the second wavelength shift material may have extremely excellent color purity. Therefore, the wavelength conversion layer 23 is configured to allow the wavelength bands of the intrinsic colors included in the white light emitted from the backlight unit 20 to the display panel 11 to have a sharp spectrum, and exhibits the effect of improving color purity and color reproducibility.

The light scattering particles may disperse or scatter the light passing through the wavelength conversion layer 23 to increase the light conversion efficiency of the wavelength shift material. The light scattering particles are not particularly limited as long as they are particles capable of scattering incident light, but may be, for example, metal oxide particles or organic material particles. Examples of the metal oxide may include titanium oxide ($TiO_2$), zirconium oxide ($ZrO_2$), aluminum oxide ($Al_2O_3$), indium oxide ($In_2O_3$), zinc oxide (ZnO), tin oxide ($SnO_2$), or a combination thereof. Examples of the organic material particles may include an acrylic resin, a urethane resin, or a combination thereof.

Meanwhile, in another embodiment, the wavelength conversion layer 23 may be omitted, and the light source 21 may also emit white light including light in the red wavelength band, light in the green wavelength band, and light in the blue wavelength band. In this case, the backlight unit 20 also provides white light to the display panel 11.

Hereinafter, the display panel 11 will be described in more detail.

The display panel 11 may include a first substrate 100 and a second substrate 200 facing each other. The first substrate 100 may be a lower substrate, and the second substrate 200 may be an upper substrate.

The first substrate 100 may include a first base substrate 110, a switching element 120 disposed on one side (upper side in FIG. 3) of the first base substrate 110, a first electrode 170 disposed on the switching element 120, and a first wavelength absorbing layer 190 disposed on the first electrode 170.

The first base substrate 110 may be a transparent insulating substrate. For example, the first base substrate 110 may be a substrate made of a glass material, a quartz material, or a light-transmitting plastic material. In some embodiments, the first base substrate 110 is flexible, and the liquid crystal display device 1 may be a curved display device.

A plurality of switching elements 120 may be disposed on the first base substrate 110. Each of the switching elements may be disposed for each of the pixels PXa, PXb, and PXc to transmit or block a driving signal to the first electrode 170. In an exemplary embodiment, each of the switching elements 120 may be a thin film transistor including a control terminal 121 connected to a gate line GL to receive a gate driving signal, an input terminal 122 connected to a data line DL to receive a data driving signal, an active layer 124 which turns on or turns off a channel according to a signal applied to the control terminal 121, and an output terminal 123 connected to the first electrode 170.

An intermediate layer 150 may be disposed on the switching element 120. The intermediate layer 150 may electrically insulate the upper structure and the lower structure from each other and may planarize the step formed by a plurality of components stacked on the first base substrate 110. The intermediate layer 150 may include one or more layers. For example, the intermediate layer 150 may be a single layer structure, or a laminate structure of a plurality of layers. The intermediate layer 150 may contain an organic material and/or an inorganic material. In a non-limiting example, the intermediate layer 150 may be at least partially exposed at the surface of the first substrate 100 facing the second substrate 200 (upper surface in FIG. 3).

The first electrode 170 may be disposed on the intermediate layer 150. The first electrode 170 may be an electric field generating electrode which forms an electric field in the liquid crystal layer 300 together with a second electrode 270 (to be described later) to rearrange the liquid crystals LC in the corresponding pixel. Although not shown in the drawing, the first electrode 170 may be electrically connected to the output terminal 123 of the switching element 120 through a contact hole formed in the intermediate layer 150. Each first electrode 170 may be a pixel electrode arranged for each of the pixels PXa, PXb, and PXc, and applied with a voltage independent of each other through the switching element 120. The first electrode 170 may be a transparent electrode made of a transparent conductive material. Examples of the material for forming the transparent electrode include indium tin oxide (ITO) and indium zinc oxide (IZO). FIG. 2 illustrates a case where the first electrode 170 defines a plurality of domains including a cross-shaped stem electrode and a plurality of slit electrodes extending radially from the stem electrode, but the present invention is not limited thereto. In a non-limiting example, the first electrode 170 may be exposed on the surface of the first substrate 100 facing the second substrate 200 (upper surface in FIG. 3).

The first wavelength absorbing layer 190 may be disposed on the first electrode 170. The first wavelength absorbing layer 190 will be described later together with a second wavelength absorbing layer 290.

Subsequently, the second substrate will be described. The second substrate 200 may include a second base substrate 210, a color conversion pattern layer 230 disposed on one side (lower side in FIG. 3) of the second base substrate 210, a second electrode 270 disposed on the color conversion pattern layer 230, and a second wavelength absorbing layer 290 disposed on the second electrode 270.

The second base substrate 210, like the first base substrate 110, may be a transparent insulating substrate. The second base substrate 210 may be flexible. A light blocking member 215 may be disposed on the second base substrate 210. The light blocking member 215 may block the transmission of light. The light blocking member 215 may have a substantially lattice shape on a plane. The light blocking member 215 may be disposed on the planar boundary of the adjacent pixels PXa, PXb, and PXc to prevent color mixing failure between the neighboring pixels. The light blocking member 215 may be made of a black matrix material or an opaque metal material.

The color conversion pattern layer 230 may be disposed on the light blocking member 215. The color conversion pattern layer 230 may include a first color conversion pattern 231 disposed in the first pixel PXa, a second color conversion pattern 232 disposed in the second pixel PXb, and a third color conversion pattern 233 disposed in the third pixel PXc. In an exemplary embodiment, each of the first color conversion pattern 231, the second color conversion pattern 232, and the third color conversion pattern 233 may be a wavelength-selective optical filter transmitting light in a specific wavelength band and blocking light in another specific wavelength band to selectively transmit only a portion of all of the wavelength bands of transmitted light. For example, each of the first color conversion pattern 231, the second color conversion pattern 232, and the third color conversion pattern 233 may be a color filter transmitting light in a specific wavelength band and blocking light in another specific wavelength band.

In an exemplary embodiment, the transmission wavelength band of the first color conversion pattern 231 may be about 580 nm to about 680 nm, about 590 nm to about 670 nm, or about 600 nm to about 660 nm, or. The first color conversion pattern 231 may be a red color filter that absorbs all visible light having a wavelength other than the transmission wavelength band. Thus, the first color conversion pattern 231 may selectively transmit only the wavelengths of light belonging to the desired red transmission wavelength band, from among the white light provided from the backlight unit 20, to display the first color (e.g., red).

The transmission wavelength band of the second color conversion pattern 232 may be about 490 nm to about 600 nm, about 500 nm to about 590 nm, or about 510 nm to about 580 nm. The second color conversion pattern 232 may be a green color filter that absorbs all visible light having a wavelength other than the transmission wavelength band. The second color conversion pattern 232 may selectively transmit only the wavelengths of light belonging to the desired green transmission wavelength band, from among the white light provided from the backlight unit 20, to display the second color.

The transmission wavelength band of the third color conversion pattern 233 may be about 420 nm to about 500 nm, about 430 nm to about 490 nm, or about 440 nm to about 480 nm. The third color conversion pattern 233 may be a blue color filter that absorbs all visible light having a wavelength other than the transmission wavelength band. The third color conversion pattern 233 may selectively transmit only the wavelengths of light belonging to the desired blue transmission wavelength band, from among the white light provided from the backlight unit 20, to display the third color.

In a non-limiting example, the transmission wavelength band of the first color conversion pattern 231 and the transmission wavelength band of the second color conversion pattern 232 may at least partially overlap each other. Further, the transmission wavelength band of the second color conversion pattern 232 and the transmission wavelength band of the third color conversion pattern 233 may at least partially overlap each other.

An overcoating layer 250 may be disposed on the color conversion pattern layer 230. The overcoating layer 250 may be a planarization layer which minimizes the step formed by the plurality of components stacked on the second base substrate 210. The overcoating layer 250 may include an organic material.

The second electrode 270 may be disposed on the overcoat layer 250. The second electrode 270 may be an electric field generating electrode that forms an electric field in the liquid crystal layer 300 together with the above-described first electrode 170. The second electrode 270 may be a common electrode which is integrally formed with no distinction among the pixels PXa, PXb, and PXc, and to which a common voltage is applied. The second electrode 270, similarly to the first electrode 170, may be a transparent electrode.

The second wavelength absorbing layer 290 may be disposed on the second electrode 270.

Hereinafter, the first wavelength absorbing layer 190 and the second wavelength absorbing layer 290 according to this embodiment will be described in detail with reference to FIGS. 4 and 5.

Figure 4:
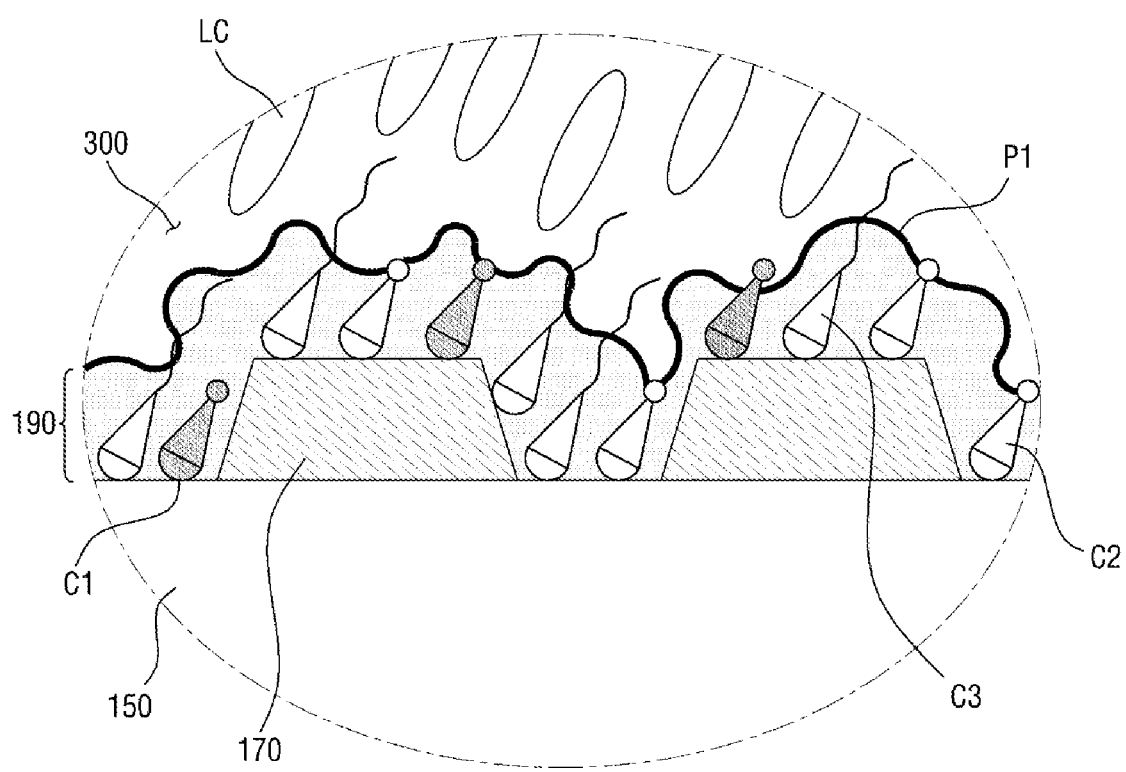
FIG. 4 is an enlarged schematic view of area A in FIG. 3.
Figure 5:
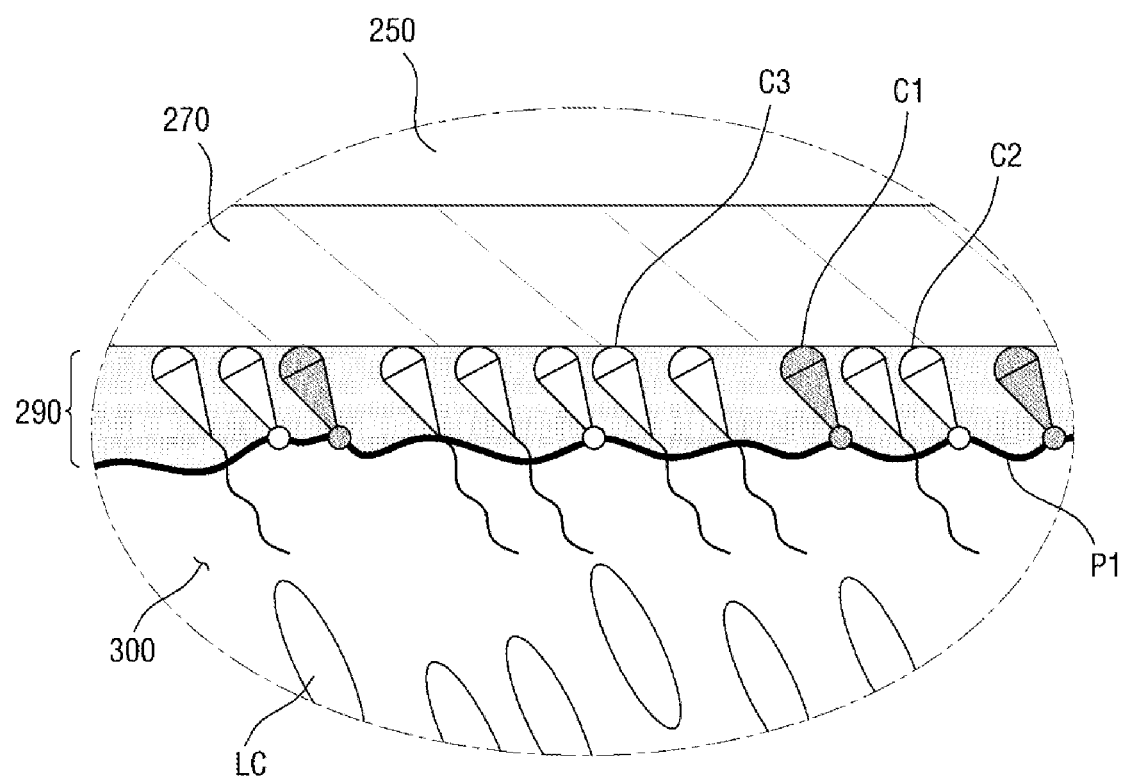
FIG. 5 is an enlarged schematic view of area B in FIG. 3.

FIG. 4 is an enlarged schematic view of area A in FIG. 3, specifically, an enlarged schematic view of the first wavelength absorbing layer 190 in FIG. 3. FIG. 5 is an enlarged schematic view of area B in FIG. 3, specifically an enlarged schematic view of the second wavelength absorbing layer 290 in FIG. 3.

Referring to FIGS. 1 to 5, the first wavelength absorbing layer 190 may be disposed on the first electrode 170. The first wavelength absorbing layer 190 may absorb a portion of an incident light wavelength. The first wavelength absorbing layer 190 may induce the initial alignment of liquid crystals LC in the adjacent liquid crystal layer 300. The first wavelength absorbing layer 190 may be in contact with the first electrode 170, the intermediate layer 150, and the liquid crystal layer 300, respectively.

The second wavelength absorbing layer 290 may be disposed on the second electrode 270. The second wavelength absorbing layer 290 may absorb a portion of an incident light wavelength. The absorption wavelength band of the second wavelength absorption layer 290 may be the same as or different from the absorption wavelength band of the first wavelength absorption layer 190. The second wavelength absorbing layer 290 may induce the initial alignment of liquid crystals LC in the adjacent liquid crystal layer 300. The second wavelength absorbing layer 290 may be in contact with the second electrode 270 and the liquid crystal layer 300, respectively.

For example, each of the first wavelength absorbing layer 190 and the second wavelength absorbing layer 290 may be a liquid crystal alignment layer having liquid crystal aligning properties for vertically aligning the liquid crystals LC. Each of the first wavelength absorbing layer 190 and the second wavelength absorbing layer 290 may be a pretilt providing layer that provides a pretilt angle to the liquid crystals LC.

In an exemplary embodiment, at least one of the first wavelength absorbing layer 190 and the second wavelength absorbing layer 290 may include a first compound C1, or a polymer P1 of the first compound C1. The first compound C1 may include a core structure and at least one hydrophilic group bound to an end of the core structure, and the hydrophilic group may include a chromophore. The first compound C1 in the first wavelength absorbing layer 190 or the second wavelength absorbing layer 290 can be understood to be a single molecule (e.g., monomer) which may be present without forming the polymer P1 of the first compound, but the present invention is not limited thereto.

In an exemplary embodiment, the core structure of the first compound C1 may include a mesogen skeleton. The mesogen skeleton may form the central skeleton of the first compound C1. The mesogen skeleton may impart predetermined liquid crystallinity to the first compound C1 to facilitate mixing of the first compound C1 with the liquid crystals LC. For example, the mesogen skeleton may be a divalent group represented by Chemical Formula 1 below.

Chemical Formula 1

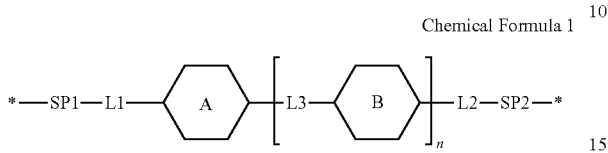

In Chemical Formula 1 above, A and B are each independently a substituted or unsubstituted aliphatic or aromatic $C_6$-$C_{12}$ cyclic hydrocarbon group. Each of A and B may be a mesogen group imparting rigid properties to the mesogen skeleton. For example, each of A and B may be 1,4-phenylene, naphthalene-2,6-diyl, 4,4'-biphenylene, 1,4-cyclohexylene, or 1,1'-bicyclohexylene, each of which is unsubstituted or is substituted with —F, —Cl, —Br, —I, —CN, —NCO, —NCS, —OCN, —SCN, or —OH. L1, L2, and L3 are each independently a single bond, —O—, —S—, —CO—, —COO—, —OCO—, —OCOO—, a $C_1$-$C_4$ alkylene, a $C_1$-$C_4$ alkoxylene, —CH=CH—, or SP1 and SP2 may be spacer groups connected to one end and to another end of the first compound C1, respectively. It is to be understood that the term "end" as used herein is used for convenience, to indicate that the various groups (i.e., hydrophilic groups, polymerizable groups, and spacer groups) are not bound to the same carbon atom, and are preferably separated from each other by more than one, or more than two, or more than five carbon atoms. Where a compound is polymeric, the various groups may be bound at terminal ends of the polymer. The spacer groups may be flexible organic groups and are connected to the ends of the mesogen group having relatively rigid properties. For example, SP1 and SP2 are each independently a single bond or a $C_1$-$C_{12}$ alkylene group.

In Chemical Formula 1, n is an integer of 1 to 3 and may define the number of repeating units of the mesogen skeleton. B and L3 in the repeating unit defined by n may be the same or different from each other.

Further, the hydrophilic group bound to an end of the first compound C1 may be a polar group having a chemical structure capable of hydrogen bonding. The hydrophilic group may impart self-alignment properties to the first compound C1. For example, the hydrophilic group may align the first compound C1 by forming hydrogen bonding with respect to a hydrophilic surface.

The hydrophilic group is not particularly limited as long as hydrogen bonding is possible, but examples thereof may include

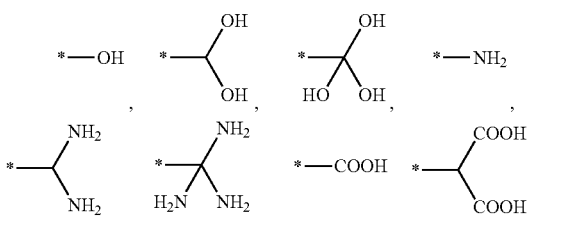

, and

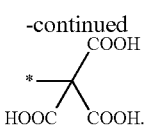

Other examples thereof may include

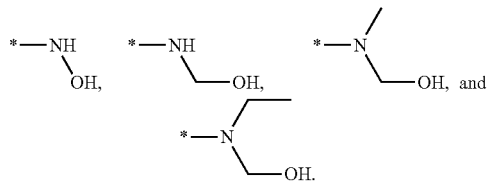

As used herein, the "*-" refers to a point of attachment, for example, between the hydrophilic group and the first compound. This is applicable to all of the present disclosure.

In an exemplary embodiment, the hydrophilic group bound to an end of the first compound C1 may include a chromophore. As used herein, the term "chromophore" means a group causing the color of a dye or a pigment. That is, the term "chromophore" means a chemical structure which absorbs a specific wavelength band of light, including ultraviolet and visible light bands. For example, the hydrophilic group bound to an end of the first compound C1 may include a porphyrazine chromophore. The porphyrazine chromophore may have an absorption peak in a range of about 580 nm to about 600 nm or in a range of about 490 nm to about 510 nm. In this case, the absorption peak wavelength of the first wavelength absorbing layer 190 and/or the second wavelength absorbing layer 290 including the first compound C1 or the polymer P1 of the first compound C1, may be in a range of about 580 nm to about 600 nm or about 490 nm to about 510 nm. In other words, in the transmittance spectrum measurement for the wavelength band of the first wavelength absorbing layer 190 or the second wavelength absorbing layer 290, the transmittance spectrum may have at least one reverse peak indicating a valley, and the reverse peak wavelength (that is, maximum absorption peak wavelength) may be in a range of about 580 nm to about 600 nm or in a range of about 490 nm to about 510 nm.

In a non-limiting example, the hydrophilic group including a porphyrazine chromophore may be represented by Chemical Formula 2 below.

Chemical Formula 2

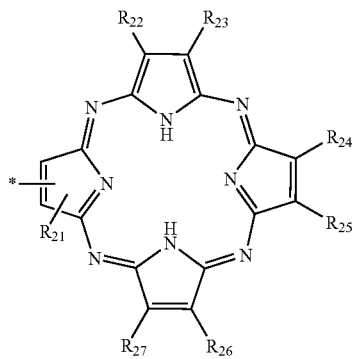

In Chemical Formula 2 above, $R_{21}$ to $R_{27}$ are each independently a hydrogen atom, a methyl group, or an ethyl group.

In an exemplary embodiment, the first compound C1 may be self-aligned in the first wavelength absorbing layer 190 and/or the second wavelength absorbing layer 290 to form a monomolecular layer. As used herein, the term "monomolecular layer" means a thin molecular layer having a thickness of about one molecule.

For example, the hydrophilic group bound to the end of the first compound C1 in the first wavelength absorbing layer 190 may be aligned toward the first electrode 170 or the intermediate layer 150. The hydrophilic group may form a hydrogen bond with a functional group exposed on the surface of the first electrode 170 and/or the intermediate layer 150, for example, a hydroxyl group. Further, the hydrophilic group bound to the end of the first compound C1 in the second wavelength absorbing layer 290 may be aligned toward the second electrode 270. The hydrophilic group may form a hydrogen bond with a functional group exposed on the surface of the second electrode 270.

In some embodiments, the first compound C1 may further include a polymerizable group bound to the other end of the core structure. The polymerizable group bound to the other end of the first compound C1 may impart polymerizability to the first compound C1 under specific conditions. For example, the polymerizable group may be a photopolymerizable group. Examples of the polymerizable group include an acryloyl group, a methacryloyl group, an acrylate group, and a methacrylate group.

The first compound C1 may be polymerized in the first wavelength absorbing layer 190 and/or the second wavelength absorbing layer 290 in a state of being self-aligned to form a polymerized monomolecular layer. That is, the first compound C1 may be polymerized to form the polymer P1. The polymer P1 may be formed between the first compounds C1 or together with a second compound C2 and/or a fourth compound $C_4$, by the polymerizable group bound to the other end of the first compound C1. The polymer P1 may be expressed in the form of a protrusion to entirely cover the first wavelength absorbing layer 190 and/or the second wavelength absorbing layer 290, but the present invention is not limited thereto. The polymer P1 may contribute to the formation of the pretilt of the liquid crystals LC in the liquid crystal layer 300.

Meanwhile, the hydrophilic group bound to the an end of the first compound C1 does not participate in the polymerization and may remain without modification to the chemical structure even after the formation of the polymer, and may maintain the polarity to such a degree that the hydrophilic group remains capable of hydrogen bonding and retains the chromaticity exhibited by the chromophore. For example, the hydrophilic group of the first compound C1 in the polymer P1 in the first wavelength absorbing layer 190, may be aligned toward the first electrode 170 or the intermediate layer 150, and the hydrophilic group of the first compound C1 in the polymer P1 in the second wavelength absorbing layer 290, may be aligned toward the second electrode 270.

In another embodiment, the core structure of the first compound C1 may include a chromophore. For example, the core structure of the first compound C1 may include a quinizarin chromophore or an azo-naphthol chromophore. The quinizarin chromophore may have an absorption peak in a range of about 580 nm to about 600 nm. In this case, the absorption peak wavelength of the first wavelength absorbing layer 190 and/or the second wavelength absorbing layer 290 including the first compound C1, or the polymer P1 of the first compound C1, may be in a range of about 580 nm to about 600 nm. Further, the azo-naphthol chromophore may have an absorption peak in a range of about 475 nm to about 490 nm. In this case, the absorption peak wavelength of the first wavelength absorbing layer 190 and/or the second wavelength absorbing layer 290 including the first compound C1 or the polymer P1 of the first compound C1 may be in a range of about 475 nm to about 490 nm.

In a non-limiting example, as the core structure of the first compound C1, the core structure having a quinizarin chromophore may be represented by Chemical Formula 3 below.

Chemical Formula 3

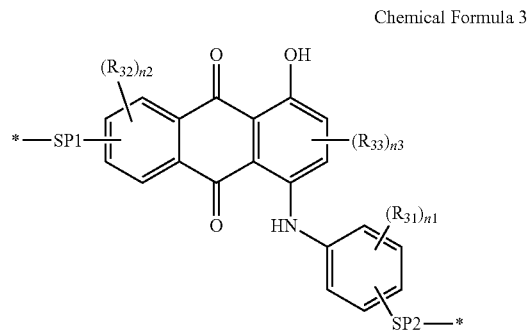

In Chemical Formula 3 above, $R_{31}$ is a methyl group or an ethyl group, $R_{32}$ and $R_{33}$ are each independently a phenyl group, n1 is an integer of 0 to 5, n2 is an integer of 0 to 3, n3 is an integer of 0 to 2, and SP1 and SP2 are each independently a single bond or a $C_1$-$C_{12}$ alkylene group.

The core structure represented by Chemical Formula 3 above may be a divalent group forming the central skeleton of the first compound C1. The core structure represented by Chemical Formula 3 above may impart predetermined liquid crystallinity to the first compound C1 to facilitate mixing with the liquid crystals LC, and may influence the initial alignment of the liquid crystals LC.

The core structure represented by Chemical Formula 3 above may be specifically exemplified by Chemical Formulas 3A to 3C as follows, but may not be limited thereto.

Chemical Formula 3A

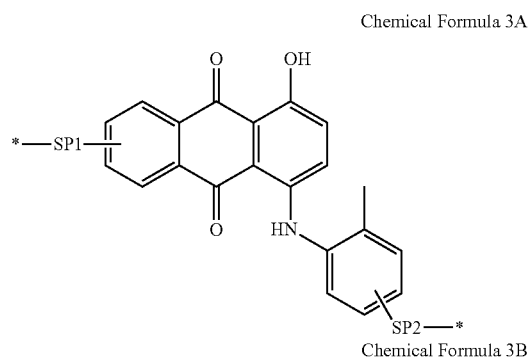

Chemical Formula 3B

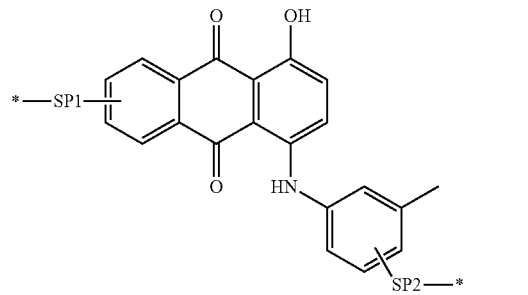

Chemical Formula 3B

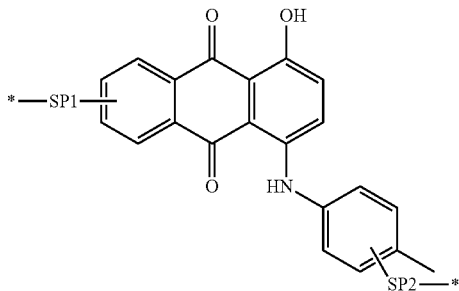

In a non-limiting example, as the core structure of the first compound C1, the core structure having an azo-naphthol chromophore may be represented by Chemical Formula 4 below.

Chemical Formula 4

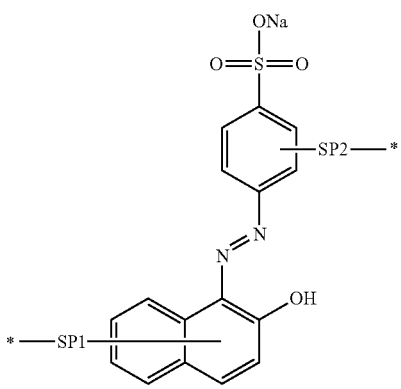

In Chemical Formula 4 above, SP1 and SP2 are each independently a single bond or a $C_1$-$C_{12}$ alkylene group.

The core structure represented by Chemical Formula 4 above may be a divalent group forming the central skeleton of the first compound C1. The core structure represented by Chemical Formula 4 above may impart predetermined liquid crystallinity to the first compound C1 to facilitate the mixing with the liquid crystals LC, and may influence the initial alignment of the liquid crystals LC.

The core structure represented by Chemical Formula 4 above may be specifically exemplified by Chemical Formulas 4A to 4C as follows, but may not be limited thereto.

Chemical Formula 4A

Chemical Formula 4B

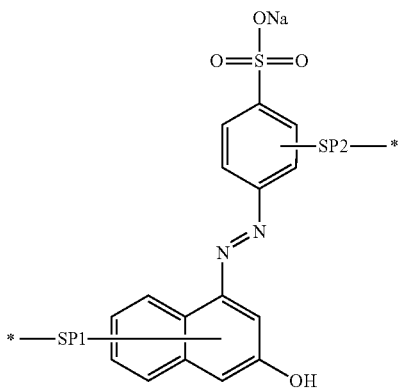

Chemical Formula 4C

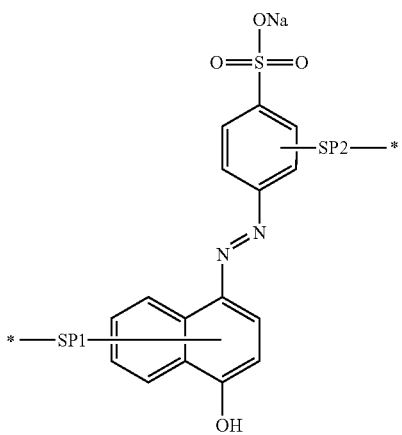

As described above, the first compound C1 having a chromophore capable of selectively absorbing the light of a specific wavelength band may be self-aligned and fixed in the form of a monomolecular layer on the surface of the first electrode 170, the intermediate layer 150, or the second electrode 270. Further, the first compound C1 may be fixed and maintained in the form of a polymerized monomolecular layer on the surface of the first electrode 170, the intermediate layer 150, or the second electrode 270 by forming the polymer P1. That is, the first wavelength absorbing layer 190 according to this embodiment may be fixed between the first electrode 170 and the liquid crystal layer 300, and the second wavelength absorbing layer 290 according to this embodiment may be fixed between the second electrode 270 and the liquid crystal layer 300. Without being limited by theory, the first compound C1 having a chromophore is believed to act as an impurity, so as to prevent the problem of the voltage holding ratio of the liquid crystal display device 1 being lowered.

In some embodiments, at least one of the first wavelength absorbing layer 190 and the second wavelength absorbing layer 290 may further include a second compound C2 including a core structure, at least one hydrophilic group bound to an end of the core structure, and a polymerizable group bound to the other end of the core structure, or a polymer P1 of the second compound C2. The second compound C2, unlike the first compound C1, may be a compound which does not include a chromophore.

The core structure of the second compound C2 may include a mesogen skeleton. The mesogen skeleton may form the central skeleton of the second compound C2. The mesogen skeleton may impart predetermined liquid crystallinity to the second compound C2 to facilitate mixing with the liquid crystals LC. Since the mesogen skeleton has been described with reference to Chemical Formula 1 above, a redundant description will be omitted.

Further, the hydrophilic group bound to the end of the second compound C2 may be a polar group having a chemical structure capable of hydrogen bonding. For example, the hydrophilic group may align the second compound C2 by forming a hydrogen bond with respect to a hydrophilic surface. Since the hydrophilic group has been previously described with regard to the first compound C1, a redundant description will be omitted.

The polymerizable group bound to the other end of the second compound C2 may impart polymerizability to the second compound C2 under specific conditions. For example, the polymerizable group may be a photopolymerizable group. Examples of the polymerizable group include an acryloyl group, a methacryloyl group, an acrylate group, and a methacrylate group.

In an exemplary embodiment, the second compound C2 may be self-aligned in the first wavelength absorbing layer 190 and/or the second wavelength absorbing layer 290 to form a monomolecular layer. In some embodiments, the second compound C2 may be polymerized in the first wavelength absorbing layer 190 and/or the second wavelength absorbing layer 290 in a state of being self-aligned to form a polymerized monomolecular layer. That is, the second compound C2 may form the polymer P1. The polymer P1 may be formed from only the second compounds C2 or may be formed from the second compound together with the first compound C1 and/or the fourth compound C4 by the polymerizable group bound to the other end of the second compound C2. The polymer P1 may contribute to the formation of the pretilt of the liquid crystals LC in the liquid crystal layer 300.

For example, the hydrophilic group bound to an end of the second compound C2 in the first wavelength absorbing layer 190 and the hydrophilic group bound to an end of the polymer P1 of the second compound C2 in the first wavelength absorbing layer 190 may be aligned toward the first electrode 170 and/or the intermediate layer 150. Further, the hydrophilic group bound to an end of the second compound C2 in the second wavelength absorbing layer 290 and the hydrophilic group bound to an end of the polymer P1 of the second compound C2 in the second wavelength absorbing layer 290 may be aligned toward the second electrode 270.

In some embodiments, at least one of the first wavelength absorbing layer 190 and the second wavelength absorbing layer 290 may further include a third compound C3 including a core structure, at least one hydrophilic group bound to an end of the core structure, and an aliphatic or aromatic hydrocarbon moiety bound to the other end of the core structure. The third compound C3, unlike the first compound C1 and the second compound C2, may be a compound having no chromophore.

The core structure of the third compound C3 may include a mesogen skeleton. The mesogen skeleton may form the central skeleton of the third compound C3. The mesogen skeleton may impart predetermined liquid crystallinity to the third compound C3 to facilitate the mixing with the liquid crystals LC. Since the mesogen skeleton has been described with reference to Chemical Formula 1 above, a redundant description will be omitted.

Further, the hydrophilic group bound to an end of the third compound C3 may be a polar group having a chemical structure capable of hydrogen bonding. For example, the hydrophilic group may align the third compound C3 by forming a hydrogen bond with a hydrophilic surface. Since the hydrophilic group has been described together with the first compound C1, a redundant description will be omitted.

The hydrocarbon moiety bound to the other end of the third compound C3 may be a vertical alignment group which induces the vertical alignment of liquid crystals LC and which has strong affinity with the liquid crystals LC. That is, the hydrocarbon moiety may be a liquid "crystal-philic" group having flexibility. The hydrocarbon moiety means a monovalent group including a chemical structure derived from an aliphatic or aromatic hydrocarbon.

The hydrocarbon moiety may include a linear, branched, or cyclic $C_1$-$C_{20}$ aliphatic hydrocarbon moiety, or an aromatic hydrocarbon moiety. Examples of the hydrocarbon moiety may include, but are not limited to, a $C_1$-$C_{20}$ alkyl group, a $C_1$-$C_{20}$ alkoxy group, a $C_3$-$C_{20}$ cycloalkyl group, a $C_6$-$C_{20}$ aryl group, and a $C_6$-$C_{20}$ heteroaryl group.

In an exemplary embodiment, the third compound C3 may be self-aligned in the first wavelength absorbing layer 190 and/or the second wavelength absorbing layer 290 to form a monomolecular layer. For example, the hydrophilic group bound to an end of the third compound C3 in the first wavelength absorbing layer 190 may be aligned toward the first electrode 170 or the intermediate layer 150. Further, the hydrophilic group bound to the end of the third compound C3 in the second wavelength absorbing layer 290 may be aligned toward the second electrode 270.

The major axis of the third compound C3 is aligned in a direction substantially perpendicular to the surface of the first electrode 170 or the second electrode 270, so that the hydrocarbon moiety bound to the other end of the third compound C3 may be aligned toward the liquid crystal layer 300. The major axis of the third compound C3, in particular, the hydrocarbon moiety of the third compound C3, contributes to the initial alignment of the liquid crystals LC in the liquid crystal layer 300.

In some embodiments, at least one of the first wavelength absorbing layer 190 and the second wavelength absorbing layer 290 may further include a fourth compound or a polymer of the fourth compound. The fourth compound includes a core structure and a polymerizable group bound to an end of the core structure and a polymerizable group bound to the other end of the core structure. The fourth compound, unlike the first compound C1, the second compound C2, and the third compound C3, may be a compound having no hydrophilic group capable of hydrogen bonding.

The core structure of the fourth compound may include a mesogen skeleton. The mesogen skeleton may form the central skeleton of the fourth compound. The mesogen skeleton may impart predetermined liquid crystallinity to the fourth compound to facilitate the mixing with the liquid crystals LC. Since the mesogen skeleton has been described with reference to Chemical Formula 1 above, a redundant description will be omitted.

The polymerizable group bound to the ends of the fourth compound may impart polymerizability to the fourth compound under specific conditions. For example, the polymerizable group may be a photopolymerizable group. Examples of the polymerizable group include an acryloyl group, a methacryloyl group, an acrylate group, and a methacrylate group. The polymer P1 may be formed from only the fourth compounds or may be formed together with the first compound C1 and/or the second compound C2 by the polymerizable groups bound to the end of the fourth compound and to the other end of the fourth compound. The polymer P1 may contribute to the formation of the pretilt of the liquid crystals LC in the liquid crystal layer 300. The polymerizable group at the end of the fourth compound and the polymerizable group at the other end of the fourth compound may be the same or different.

The liquid crystal display device 1 according to an embodiment selectively absorbs light of a specific wavelength band using the first wavelength absorbing layer 190 and the second wavelength absorbing layer 290 to improve the color reproducibility of the liquid crystal display device 1. For example, when the first wavelength absorbing layer 190 and/or the second wavelength absorbing layer 290 include the first compound (C1) having a porphyrazine chromophore or the polymer (P1) thereof, each of the first wavelength absorbing layer 190 and the second wavelength absorbing layer 290 may selectively absorb a wavelength band in a range of about 580 nm to about 600 nm or in a range of about 490 nm to about 510 nm. Further, when the first wavelength absorbing layer 190 and/or the second wavelength absorbing layer 290 include the first compound (C1) having a quinizarin chromophore or the polymer (P1) thereof, each of the first wavelength absorbing layer 190 and the second wavelength absorbing layer 290 may selectively absorb a wavelength band in a range of about 580 nm to about 600 nm. Further, when the first wavelength absorbing layer 190 and/or the second wavelength absorbing layer 290 include the first compound (C1) having an azo-naphthol chromophore or the polymer (P1) thereof, each of the first wavelength absorbing layer 190 and the second wavelength absorbing layer 290 may selectively absorb a wavelength band in a range of about 475 nm to about 490 nm.

For example, the light provided from the backlight unit 20 may be white light having an intrinsic wavelength of the first color (that is, red), an intrinsic wavelength of the second color (that is, green), and an intrinsic wavelength of the third color (that is, blue). The white light provided from the backlight unit 20 may sequentially be transmitted through the first wavelength absorbing layer 190, the second wavelength absorbing layer 290, and the color conversion pattern layer 230, and then express a specific color.

Each of the intrinsic wavelengths of the first to third colors included in the white light provided by the backlight unit 20 may have a relatively wide wavelength spectrum, resulting in poor color purity. However, the liquid crystal display device 1 according to this embodiment may at least partially absorb a wavelength band between the peak wavelength of the first color and the peak wavelength of the second color and a wavelength band between the peak wavelength of the second color and the peak wavelength of the third color, so as to improve the color purity of the light passed through the display panel 11.

For example, in the white light incident on the first wavelength absorbing layer 190, at least a portion of the light within the wavelength band of about 475 nm to about 490 nm, about 490 nm to about 510 nm, or about 580 nm to about 600 nm may be absorbed by the first wavelength absorbing layer. Thus, the intrinsic wavelength spectrum of the first to third colors included in the white light becomes sharp, and primary color purity improvement can be exhibited.

Further, for the white light incident on the second wavelength absorbing layer 290 after passing through the first wavelength absorbing layer, at least a portion of light within the wavelength band of about 475 nm to about 490 nm, about 490 nm to about 510 nm, or about 580 nm to about 600 nm may be absorbed by the second wavelength absorbing layer. Thus, the intrinsic wavelength spectrum of the first to third colors included in the white light becomes sharper, and secondary color purity improvement can be exhibited.

The white light, the color purity of which is improved by the first wavelength absorbing layer 190 and the second wavelength absorbing layer 290, may pass through the the first color conversion pattern 231, the second color conversion pattern 232, and the third color conversion pattern 233, and may be converted so as to express the first color, the second color, and the third color, thereby expressing the desired colors of the liquid crystal display device.

The transmission wavelength band of each of the first color conversion pattern 231, the second color conversion pattern 232, and the third color conversion pattern 233 has a relatively wide wavelength spectrum, such that, the color conversion pattern layer 230 may not exhibit excellent color reproducibility. However, since the liquid crystal display device 1 according to this embodiment includes the first wavelength absorbing layer 190 and the second wavelength absorbing layer 290 having an absorption peak wavelength at least partially overlapping the transmission wavelength width of each of the first color conversion pattern 231, the second color conversion pattern 232, and the third color conversion pattern 233, the liquid crystal display device 1 may partially absorb the wavelength which is not absorbed by the first color conversion pattern 231, the second color conversion pattern 232, and the third color conversion pattern 233, and which can transmit the first color conversion pattern 231, the second color conversion pattern 232, and the third color conversion pattern 233. Thus, after passing through the display panel 11, the light may have a sharper spectrum.

Since each of the first wavelength absorbing layer 190 and the second wavelength absorbing layer 290 of the liquid crystal display device 1 according to the present embodiment includes the polymer P1, the first wavelength absorbing layer 190 and the second wavelength absorbing layer 290 may be stably fixed between the first electrode 170 and the liquid crystal layer 300 and between the second electrode 270 and the liquid crystal layer 300, respectively. Thus, the first compound C1 including a chromophore acts as an impurity, so as to prevent the problem of the voltage holding ratio of the liquid crystal display device 1 being lowered.

Subsequently, the liquid crystal layer 300 will be described. The liquid crystal layer 300 may include a plurality of liquid crystals LC which have an initial alignment. The liquid crystals LC may have negative dielectric anisotropy, and may be substantially vertically aligned in the initial alignment state. In some embodiments, the liquid crystals LC may have a pretilt angle in the initial alignment state. In this specification, the term "initial alignment of liquid crystals" means alignment of liquid crystals in a state where an electric field is not present (e.g., formed) in the liquid crystal layer.

The initial alignment of the liquid crystals LC may be induced by the above-described first wavelength absorbing layer 190 and second wavelength absorbing layer 290. That is, at least one of the first wavelength absorbing layer 190 and the second wavelength absorbing layer 290 may have liquid crystal aligning properties. When an electric field is formed between the first electrode 170 and the second electrode 270, the liquid crystals LC may be tilted in a specific direction to change the polarization state of the light transmitted through the liquid crystal layer 300. In another embodiment, the liquid crystals LC may have positive dielectric anisotropy.

Hereinafter, a liquid crystal display device according to another embodiment of the present invention will be described. However, a description of those elements which are in substantially the same configuration as that of the above-described liquid crystal display device 1 will be omitted, which can be understood by those skilled in the art from the attached drawings. The same reference numerals are used for like elements throughout.

Figure 6:
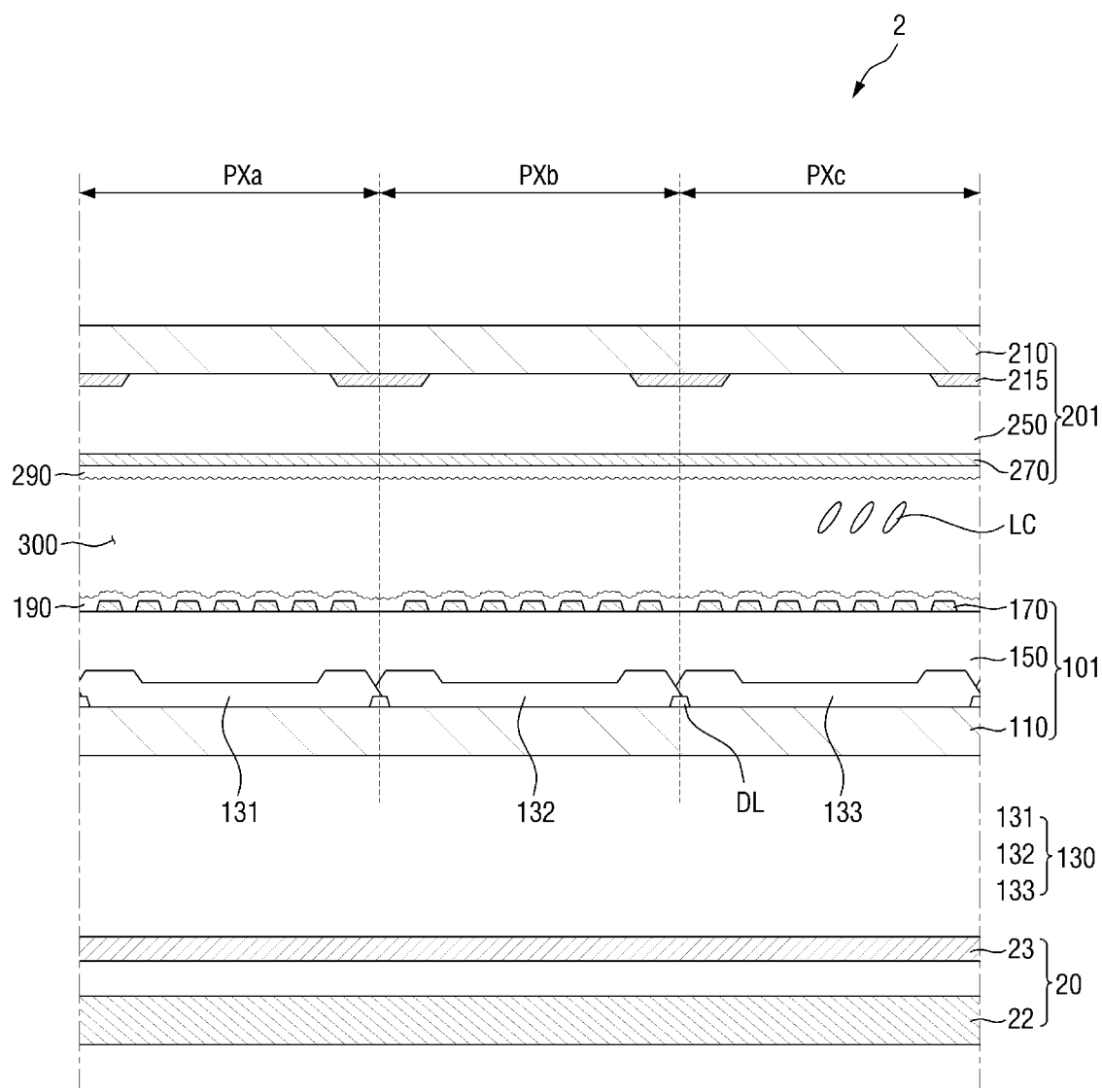
FIG. 6 is a cross-sectional view of a liquid crystal display device according to another embodiment of the present invention.

FIG. 6 is a cross-sectional view of a liquid crystal display device according to another embodiment of the present invention.

Referring to FIG. 6, a liquid crystal display device 2 according to this embodiment is different from the liquid crystal display device 1 described with reference to FIG. 1 in that a color conversion pattern layer 130 is included on the first substrate 101.

In an exemplary embodiment, the first substrate 101 may include a first base substrate 110, a switching element (not shown), a first electrode 170, and a first wavelength absorbing layer 190, and may further include a color conversion pattern layer 130.

The color conversion pattern layer 130 may be disposed on the first base substrate 110. FIG. 6 illustrates a case where the color conversion pattern layer 130 is disposed between the first base substrate 110 and the intermediate layer 150. However, when the intermediate layer 150 is formed of a plurality of layers, the color conversion pattern layer 130 may be interposed between the plurality of layers.

The color conversion pattern layer 130 may include a first color conversion pattern 131 disposed in the first pixel PXa, a second color conversion pattern 132 disposed in the second pixel PXb, and a third color conversion pattern 133 disposed in the third pixel PXc. For example, each of the first color conversion pattern 131, the second color conversion pattern 132, and the third color conversion pattern 133 may be a color filter transmitting light in a specific wavelength band and absorbing light in another specific wavelength band.

The white light provided from the backlight unit 20 may be sequentially transmitted to the color conversion pattern layer 130, the first wavelength absorbing layer 190, and the second wavelength absorbing layer 290, and then finally expressed as a specific color.

For example, the white light provided from the backlight unit 20 may be transmitted to the first color conversion pattern 131, the second color conversion pattern 132, and the third color conversion pattern 133, and then may be converted so as to express a first color, a second color, and a third color, respectively. The present invention is not limited to this, but the light after passing through the first color conversion pattern 131 may include a wavelength of about 580 nm to about 680 nm, the light after passing through the second color conversion pattern 132 may include a wavelength of about 490 nm to about 600 nm, and the light after passing through the third color conversion pattern 133 may include a wavelength of about 420 nm to about 500 nm.

Further, the light after passing through the first color conversion pattern 131 sequentially passes through the first wavelength absorbing layer 190 and the second wavelength absorbing layer 290, so as to improve color purity. For example, for the light in a wavelength band of about 580 nm to about 680 nm having passed through the first color conversion pattern 131, at least a portion of the wavelength band of about 580 nm to about 680 nm may be absorbed by the first wavelength absorbing layer 190 and the second wavelength absorbing layer 290. Similarly, for the light in a wavelength band of about 490 nm to about 600 nm having passed through the second color conversion pattern 132, at least a part of the wavelength band of about 490 nm to about 510 nm and/or about 580 nm to about 600 nm may be absorbed by the first wavelength absorbing layer 190 and the second wavelength absorbing layer 290. Further, for the light in a wavelength band of about 420 nm to about 500 nm having passed through the third color conversion pattern 133, at least a part of the wavelength band of about 475 nm to about 490 nm may be absorbed by the first wavelength absorbing layer 190 and the second wavelength absorbing layer 290. Thus, the intrinsic wavelength spectrum of the first to third colors expressed by the liquid crystal display device 2 becomes sharper, and color reproducibility can be improved.

Figure 7:
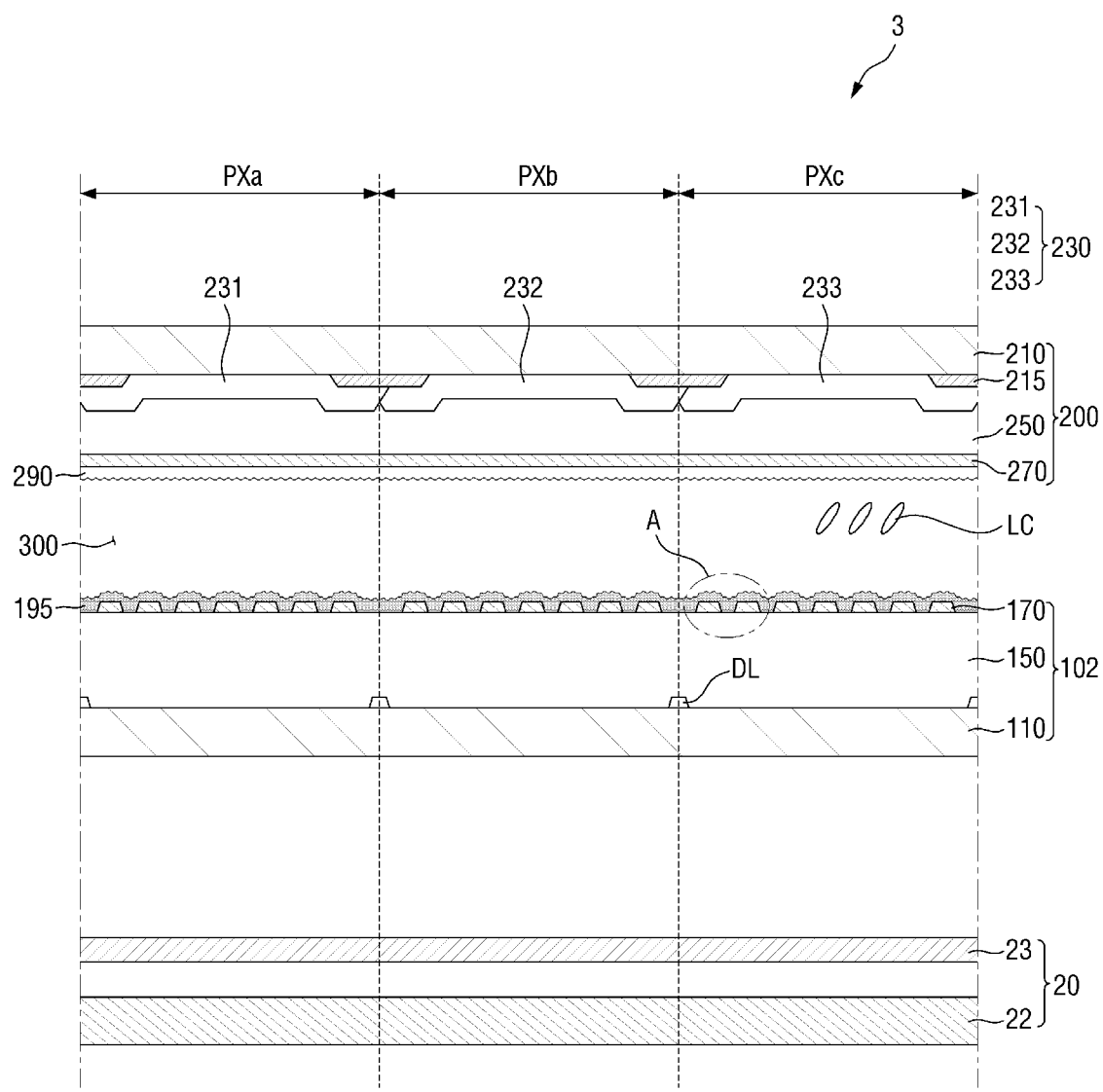
FIG. 7 is a cross-sectional view of a liquid crystal display device according to still another embodiment of the present invention.
Figure 8:
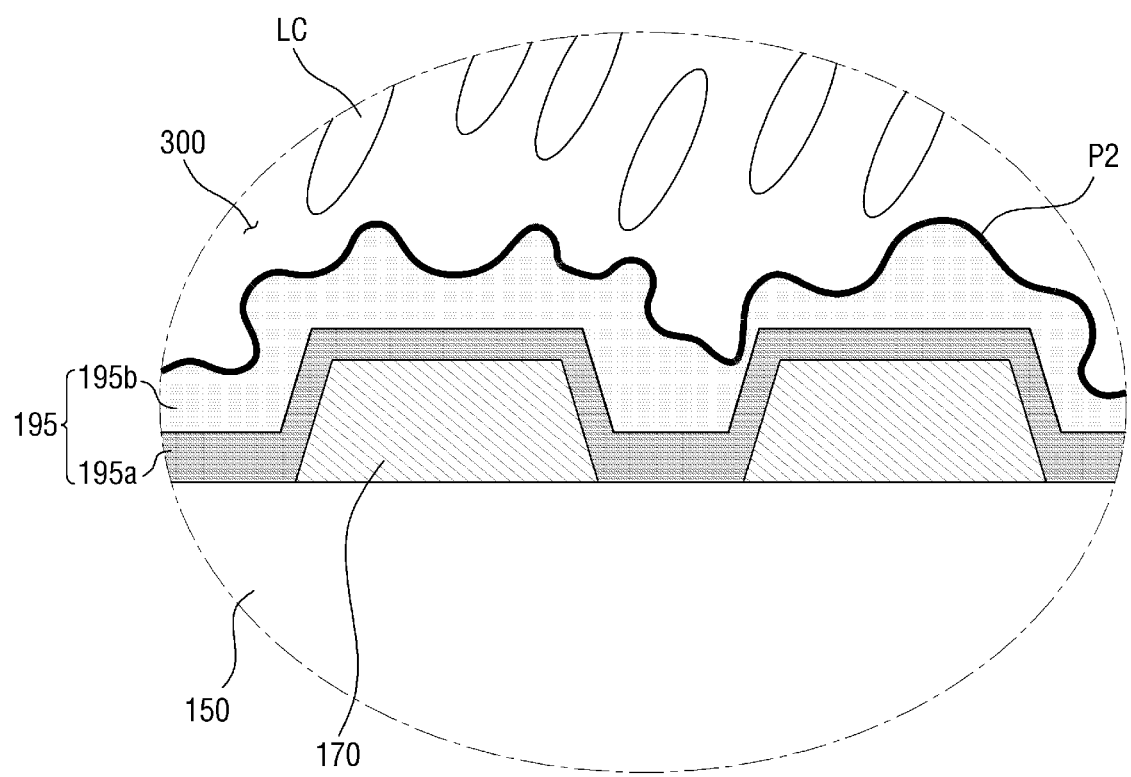
FIG. 8 is an enlarged schematic view of area A in FIG. 7.

FIG. 7 is a cross-sectional view of a liquid crystal display device according to still another embodiment of the present invention. FIG. 8 is an enlarged schematic view of area A in FIG. 7, which is an enlarged schematic view of the liquid crystal alignment layer 195 in FIG. 7.

Referring to FIGS. 7 and 8, a liquid crystal display device 3 according to this embodiment is different from the liquid crystal display 1 described with reference to FIG. 1 in that a liquid crystal alignment layer 195, containing a polyimide polymer, is present instead of the first wavelength absorbing layer 190.

In an exemplary embodiment, a first substrate 102 may include a first base substrate 110, a switching element (not shown), a first electrode 170, and a liquid crystal alignment layer 195 containing a polyimide polymer. The liquid crystal alignment layer 195 may be in contact with the first electrode 170, the intermediate layer 150, and the liquid crystal layer 300, respectively. The liquid crystal alignment layer 195 may induce the initial alignment of liquid crystals LC in the adjacent liquid crystal layer 300. Further, the liquid crystal alignment layer 195 may be a pretilt providing layer that provides a predetermined pretilt angle to the liquid crystals LC.

In an exemplary embodiment, the liquid crystal alignment layer 195 may include a polyimide polymer layer 195a having an imide group as the repeating unit of a main chain and a side chain of a vertical alignment group bonded to the main chain. In some embodiments, the polyimide polymer layer 195a may further include a side chain of a photoinitiator group bound to the main chain. The liquid crystal alignment layer 195 may further include a polymer layer 195b entirely covering the polyimide polymer layer 195a. The polymer layer 195b may be in the shape of protrusions, but the present invention is not limited thereto. For example, the polyimide polymer layer 195a may contribute to the vertical alignment of the liquid crystals LC, and the polymer layer 195b may contribute to the formation of the initial pretilt of the liquid crystals LC.

The polymer layer 195b may contain the polymer P2 of the above-described fourth compound. Since the fourth compound has been described with reference to FIG. 1 and the like, a redundant description will be omitted.

In an exemplary embodiment, the surface roughness of a side (upper side in FIG. 7) of the liquid crystal alignment layer 195 facing the liquid crystal layer 300 is larger than the surface roughness of a side (lower side in FIG. 7) of the second wavelength absorbing layer 290 facing the liquid crystal layer 300.

The polymer P2 of the polymer layer 195b of the liquid crystal alignment layer 195 and the polymer P1 of the second wavelength absorbing layer 290 can be in the form of microprotrusions. The amount of the polymer P2 in the liquid crystal alignment layer 195 per unit area may be larger than the amount of the polymer P1 in the second wavelength absorbing layer 290 per unit area. That is, the degree of polymerization, the content per unit area, and the absolute amount of the polymer of the fourth compound in the liquid crystal alignment layer 195 may be greater than those of the polymer in the second wavelength absorbing layer 290.

Without being limited by theory, it is believed that the differences may be due to the presence of the side chain of a photoinitiator group included in the polyimide polymer layer 195a of the liquid crystal alignment layer 195. In a non-limiting example, the polyimide polymer layer 195a may generate a sufficient amount of free radicals with a photoinitiator group, whereas a self-aligned monomolecular layer may not and so a difference in the content of the polymers P1 and P2 may occur.

Meanwhile, as described above, the polymer P2 in the liquid crystal alignment layer 195 and the polymer P1 in the second wavelength absorbing layer 290 contribute to the formation of the pretilt of the liquid crystals LC in the liquid crystal layer 300. Therefore, the pretilt of the liquid crystals (lower portion in the liquid crystal layer 300) adjacent to the liquid crystal alignment layer 195 including a larger amount of polymer may be greater than the pretilt of the liquid crystals (upper portion in the liquid crystal layer 300) adjacent to the second wavelength absorbing layer 290.

Although not shown in the drawings, in some embodiments, the liquid crystal display device 3 may be a curved liquid crystal display device. For example, a side (upper side in FIG. 7) of the first substrate 102 facing the second substrate 200 may be bent so as to have a concave curved surface, and a side (lower side in FIG. 7) of the second substrate 200 facing the first substrate 102 may be bent to have a convex curved surface.

The liquid crystal display device 3 according to this embodiment may be configured such that the pretilts of the liquid crystals LC in the upper and lower portions of the liquid crystal layer 300 are different from each other. Thus, there is an effect of preventing the formation of stains or dark sites caused by the collision of the liquid crystals LC in the rearrangement direction in the curved liquid crystal display device.

Figure 9:
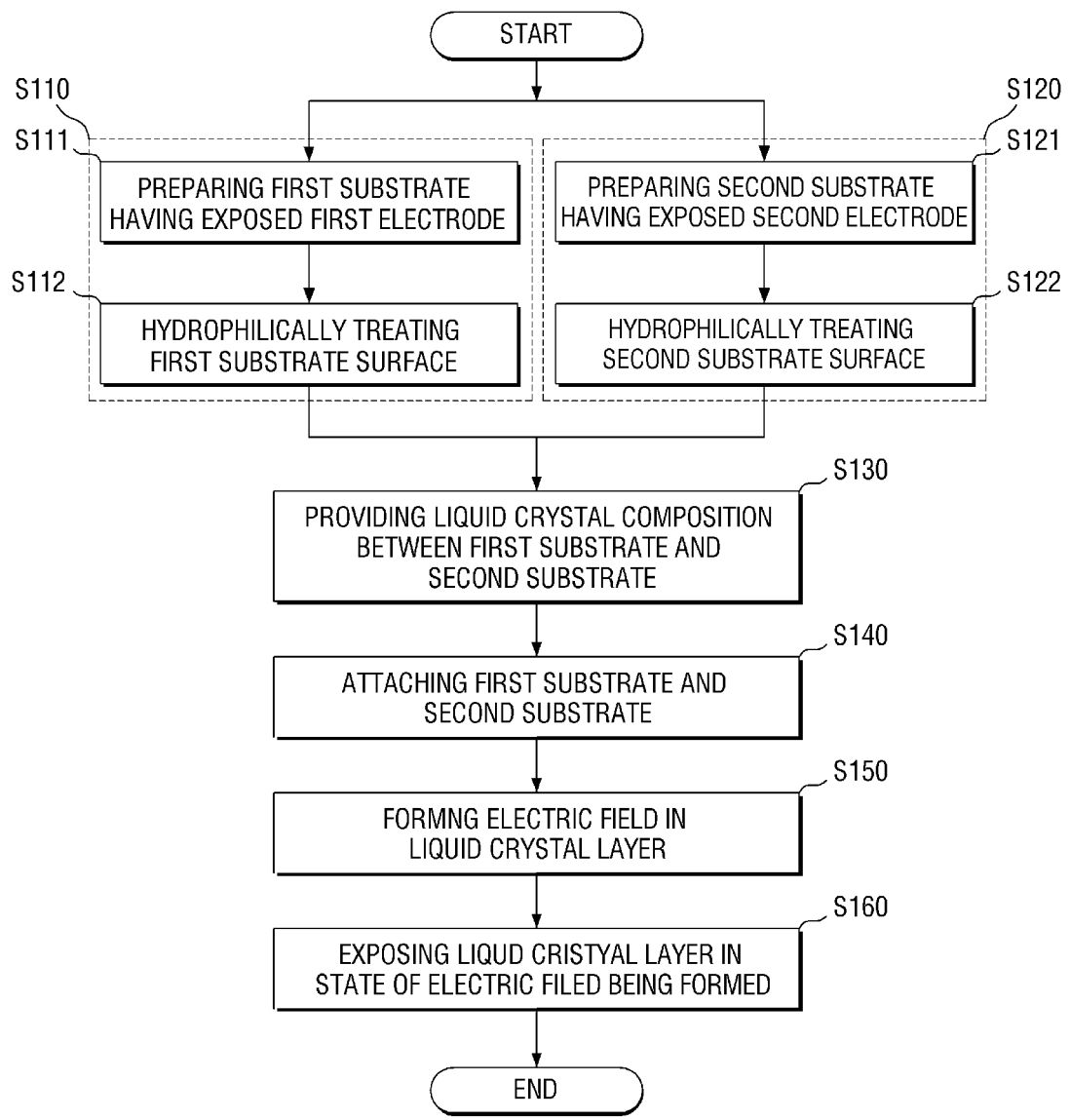
FIG. 9 is a flowchart of a method of manufacturing a liquid crystal display device according to an embodiment of the present invention.

Hereinafter, a method of manufacturing a liquid crystal display device according to an embodiment of the present invention will be described. FIG. 9 is a flowchart illustrating a method of manufacturing a liquid crystal display device according to an embodiment of the present invention. FIGS. 10 to 20 are cross-sectional views illustrating the manufacturing method of FIG. 9.

Figure 10:
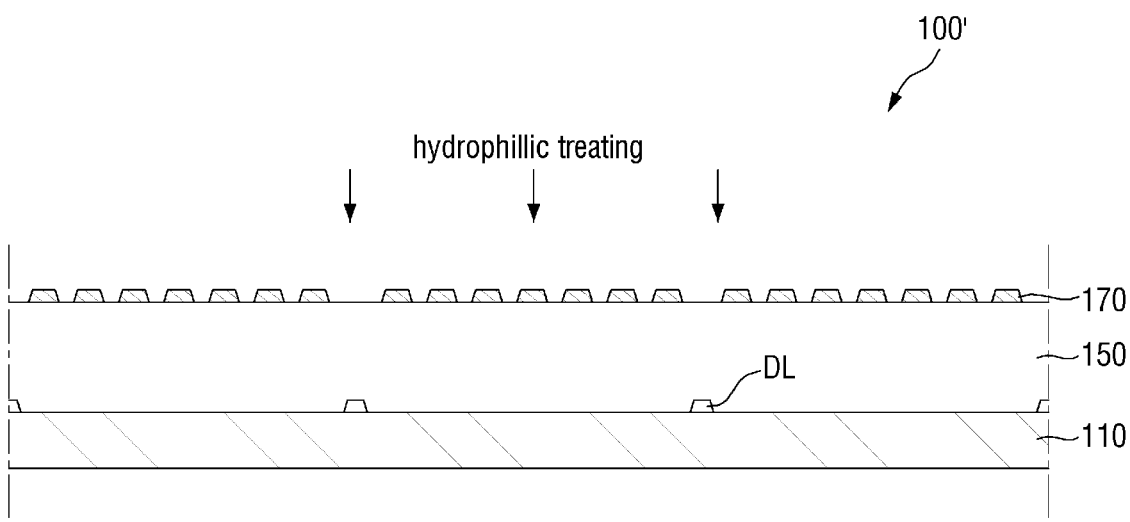
FIGS. 10 to 20 are cross-sectional views illustrating the steps in the manufacturing method of FIG. 9.

First, referring to FIGS. 9 and 10, a first substrate 100' whose surface has been subjected to hydrophilic treatment is prepared (S110). Specifically, a first substrate 100' including a first base substrate 110, a switching element (not shown), an intermediate layer 150, and a first electrode 170 are prepared (S111), and the surface of the first substrate 100' is subjected to a hydrophilic treatment (S112).

The intermediate layer 150 and the first electrode 170, which are made of an organic material or an inorganic material, may be at least partially exposed at the surface of the first substrate 100'. Since the components included in the first substrate 100' have been described with reference to FIG. 3 and the like, any redundant description will be omitted.

The step (S112) of subjecting the first substrate 100' to hydrophilic treatment may include ozone treatment, plasma treatment, ultraviolet treatment, or a combination thereof. The hydrophilicity of the surface of the intermediate layer 150 on the surface of the first substrate 100' and the hydrophilicity of the surface of the first electrode 170 can be controlled by performing the step (S112) of subjecting the first substrate 100' to hydrophilic treatment. For example, the hydrophilicity of the surface of the first substrate 100' can be increased. Thus, it is possible to maximize the self-alignment characteristics of the first to third compounds in a liquid crystal composition (to be described later) on the surface of the first electrode 170. The intermediate layer 150 and the first electrode 170 may be partially exposed even after the step (S112) of hydrophilic treatment.

Figure 11:
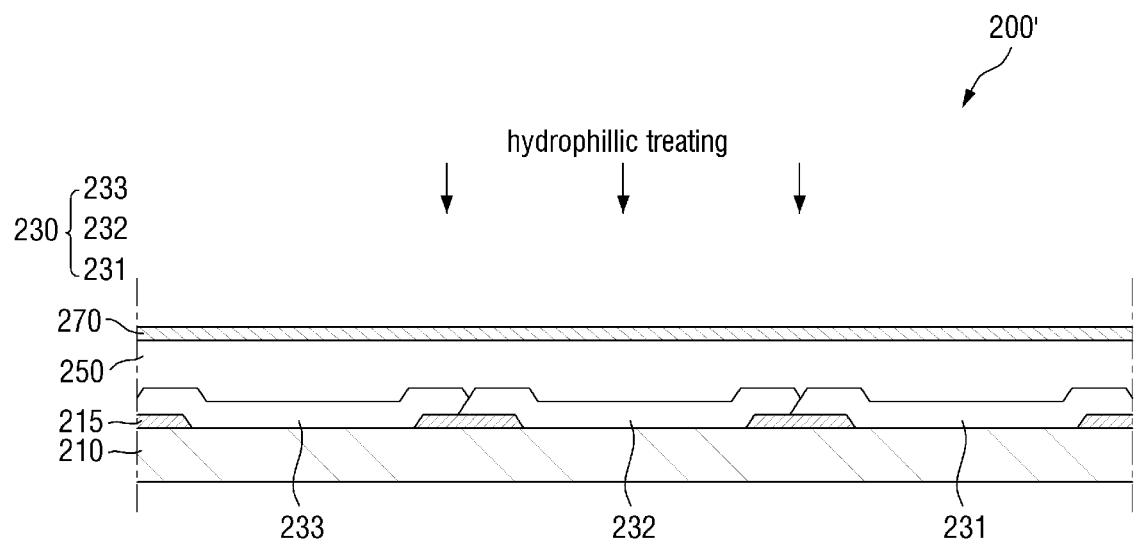

Subsequently, referring to FIGS. 9 and 11, a second substrate 200' whose surface has been subjected to hydrophilic treatment is prepared (S120). Specifically, a second substrate 200' including a second base substrate 210, a color conversion pattern layer 230, and a second electrode 270 is prepared (S121), and the surface of the second substrate 200' is subjected to hydrophilic treatment (S122). The second electrode 270 may be at least partially exposed to the surface of the second substrate 200'. Since the components included in the second substrate 200' have been described with reference to FIG. 3 and the like, redundant description will be omitted.

The step (S122) of subjecting the second substrate 200' to hydrophilic treatment may include ozone treatment, plasma treatment, ultraviolet treatment, or a combination thereof. The hydrophilicity of the surface of the second electrode 270 on the surface of the second substrate 200' can be controlled by performing the step (S122) of subjecting the second substrate 200' to hydrophilic treatment. For example, the hydrophilicity of the surface of the second substrate 200' can be increased. The second electrode 270 may be partially exposed even after the step (S122) of hydrophilic treatment.

In some embodiments, the degree of hydrophilic treatment of the surface of the first substrate 100' and the degree of hydrophilic treatment of the surface of the second substrate 200' may be different from each other. For example, the degree of hydrophilic treatment of the surface of the first substrate 100' may be greater than the degree of hydrophilic treatment of the surface of the second substrate 200'. In another embodiment, at least one of the step (S112) of subjecting the first substrate 100' to hydrophilic treatment and the step (S122) of subjecting the second substrate 200' to hydrophilic treatment may be omitted.

Subsequently, referring to FIGS. 9 to 12, a liquid crystal composition 400 is provided (disposed) between the first substrate 100' and the second substrate 200' (S130). In an exemplary embodiment, the liquid crystal composition 400 may include liquid crystals LC and a first compound C1. The first compound may include a core structure and at least one hydrophilic group bound to an end of the core structure, and the at least one hydrophilic group may include a chromophore. In some embodiments, the liquid crystal composition 400 may include a second compound C2 including a core structure, at least one hydrophilic group bound to an end of the core structure, and a polymerizable group bound to the other end of the core structure; a third compound C3 including a core structure, at least one hydrophilic group bound to an end of the core structure, and an aliphatic or aromatic hydrocarbon moiety bound to the other end of the core structure; a fourth compound C4 including a core structure and a polymerizable group bound to an end of the core structure and a polymerizable group bound to the other end of the core structure; or a combination thereof.

As described above, all of the first to fourth compounds C1 to C4 may include a mesogen skeleton as a core structure to provide predetermined liquid crystallinity to the compounds. Thus, there is sufficient miscibility between the liquid crystals LC and the first to fourth compounds C1 to C4, and the liquid crystals LC and the first to fourth compounds C1 to C4 are uniformly dispersed in the liquid crystal composition 400 to prevent phase separation between the components. Since the first compound C1, the second compound C2, the third compound C3, and the fourth compound C4 have been described with reference to FIG. 3 and the like, redundant description will be omitted.

In some embodiments, the first compound C1 having a chromophore may be included in an amount of about 0.1 weight percent (wt %) to 3.0 wt % based on the total weight of the liquid crystal composition 400. When the first compound C1 having a chromophore is included in an amount of 0.1 wt % or more, the first compound C1 absorbs specific wavelength bands. That is, the first compound C1 absorbs light having a wavelength band between the peak wavelength of the first color and the peak wavelength of the second color, and light having a wavelength band between the peak wavelength of the second color and the peak wavelength of the third color, so as to improve the color reproducibility of the liquid crystal display device. Further, when the first compound C1 is included in an amount of 3.0 wt % or less, it is possible to prevent the excessive deterioration of luminance and to prevent an increase in the amount of impurities present in the liquid crystal layer 300.

Figure 12:
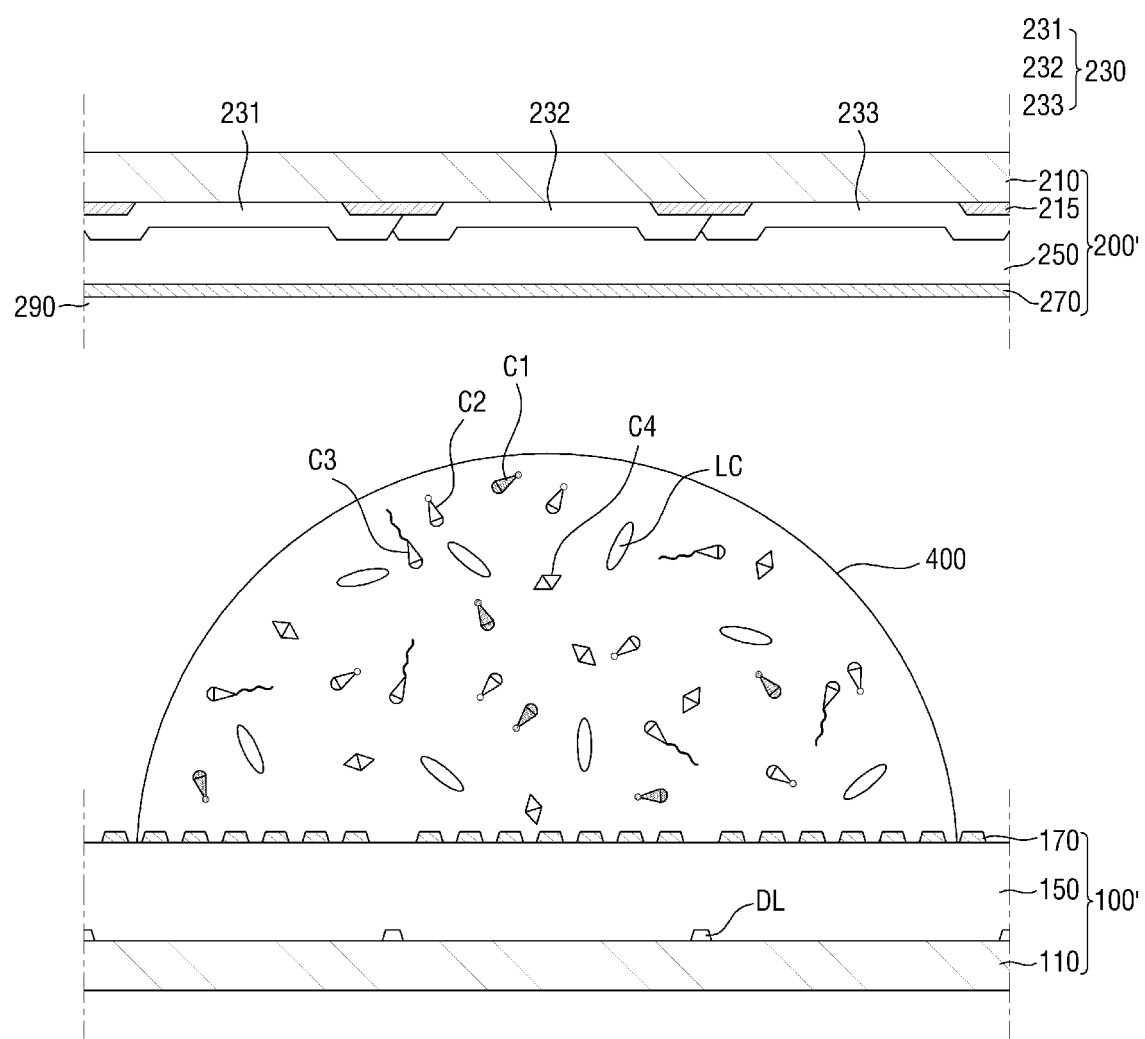

In an exemplary embodiment, the step (S130) of providing the liquid crystal composition 400 may be a step of contacting the liquid crystal composition 400 with the first electrode 170 and the intermediate layer 150 exposed at the surface of the first substrate 100'. FIG. 12 illustrates a case where the liquid crystal composition 400 is dropped onto the surface of the first substrate 100'. In another embodiment, the liquid crystal composition 400 may be dropped onto the surface of the second substrate 200'. In this case, the liquid crystal composition 400 may be in contact with the surface of the second electrode 270 exposed at the surface of the second substrate 200', and in step (S140) of forming the liquid crystal layer 300, to be described later, the liquid crystal composition 400 may be in contact with the first electrode 170 and the intermediate layer 150 exposed at the surface of the first substrate 100'.

Subsequently, referring to FIGS. 9 to 13, the first substrate 100' and the second substrate 200' are attached to each other with a liquid crystal layer 300 (S140) formed therebetween. The first substrate 100' and the second substrate 200' may be attached to each other using a sealing member (not shown), for example, a sealant. The liquid crystal layer 300 may be defined by being sealed and surrounded by the first substrate 100', the second substrate 200', and the sealing member.

In an exemplary embodiment, the liquid crystal layer 300 may be formed between the first substrate 100' and the second substrate 200', and then phase separation may occur between the first compound C1, the second compound C2, and the third compound C3 and the liquid crystals LC. For example, at least some of the first compound C1 to the third compound C3 are aligned on the surface of the first substrate 100' and the surface of the second substrate 200', respectively, so as to form a first alignment layer 190' and a second alignment layer 290'. In the step (S140) of forming the liquid crystal layer 300, each of the first to fourth compounds C1 to C4 may be monomolecular compounds.

Figure 13:
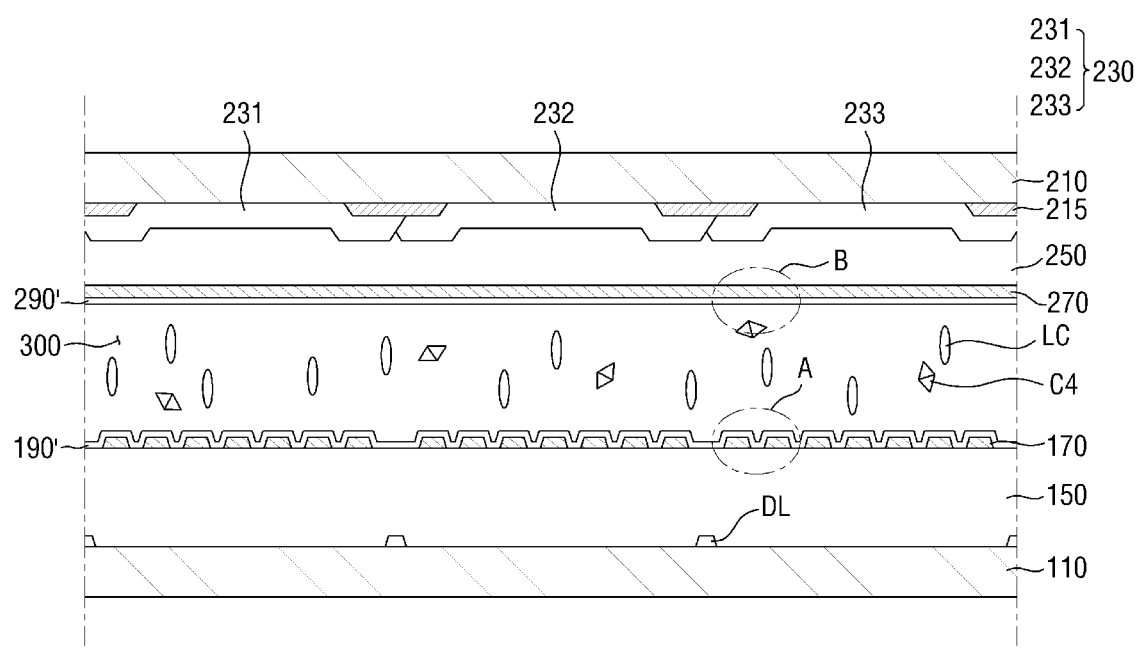

FIGS. 12 and 13 illustrate a process in which the liquid crystal layer 300 is formed by dropping the liquid crystal composition 400 on the surface of the first substrate 100' and then attaching the first substrate 100' and the second substrate 200'. Alternatively, in another embodiment, the liquid crystal layer 300 may be formed by attaching the first substrate 100' and the second substrate 200' and injecting the liquid crystal composition 400 therebetween.

Hereinafter, the formation of the first alignment layer 190' and the second alignment layer 290' in the step (S140) of forming the liquid crystal layer 300 will be described in more detail with reference to FIGS. 14 and 15.

Figure 14:
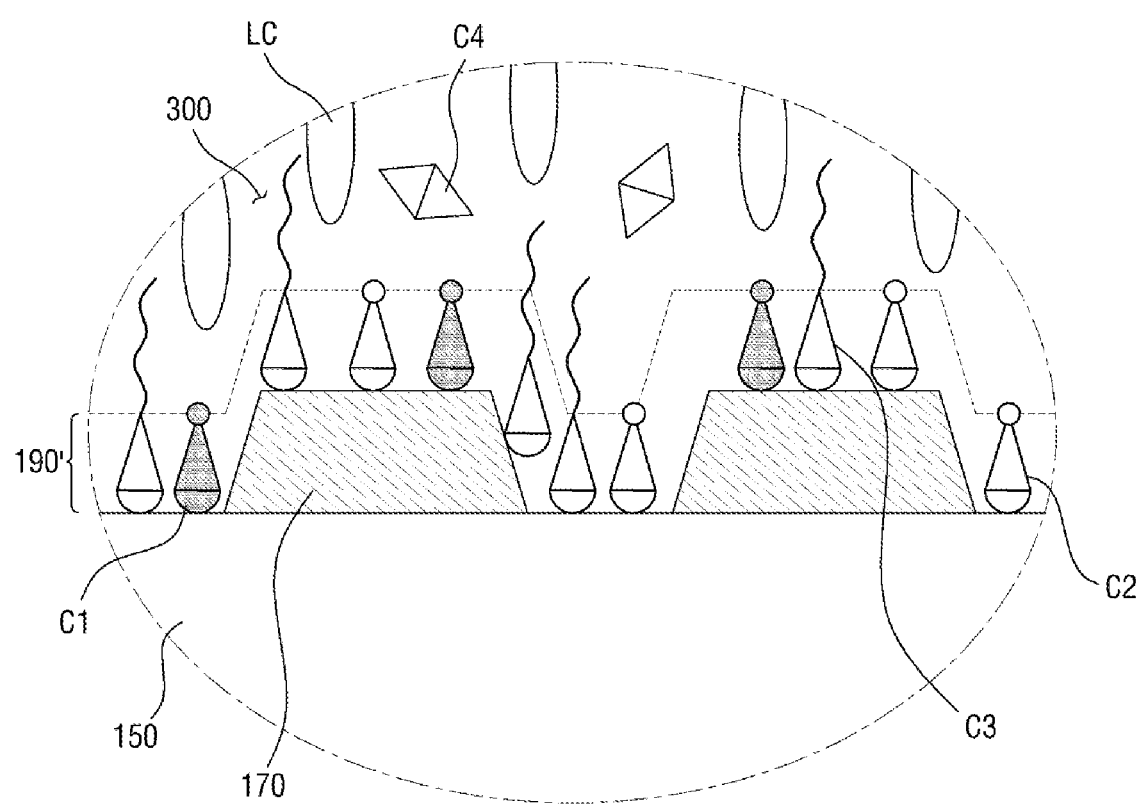
Figure 15:
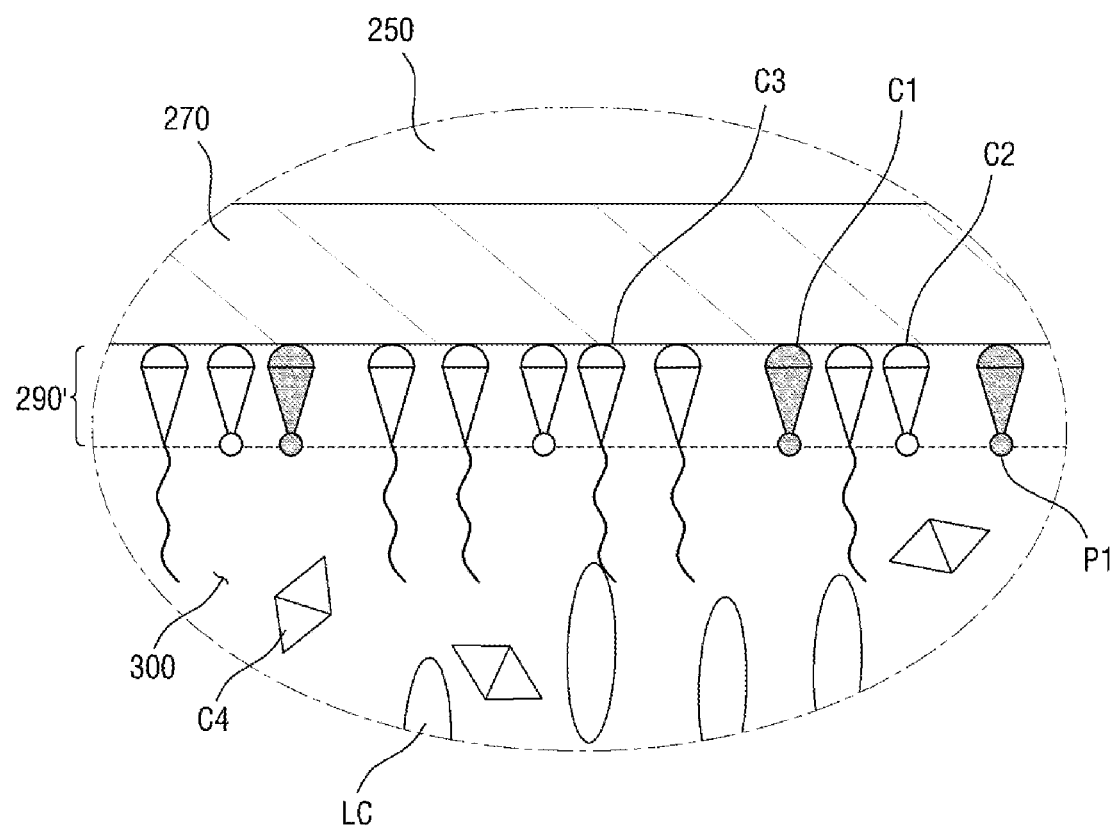
Figure 16:
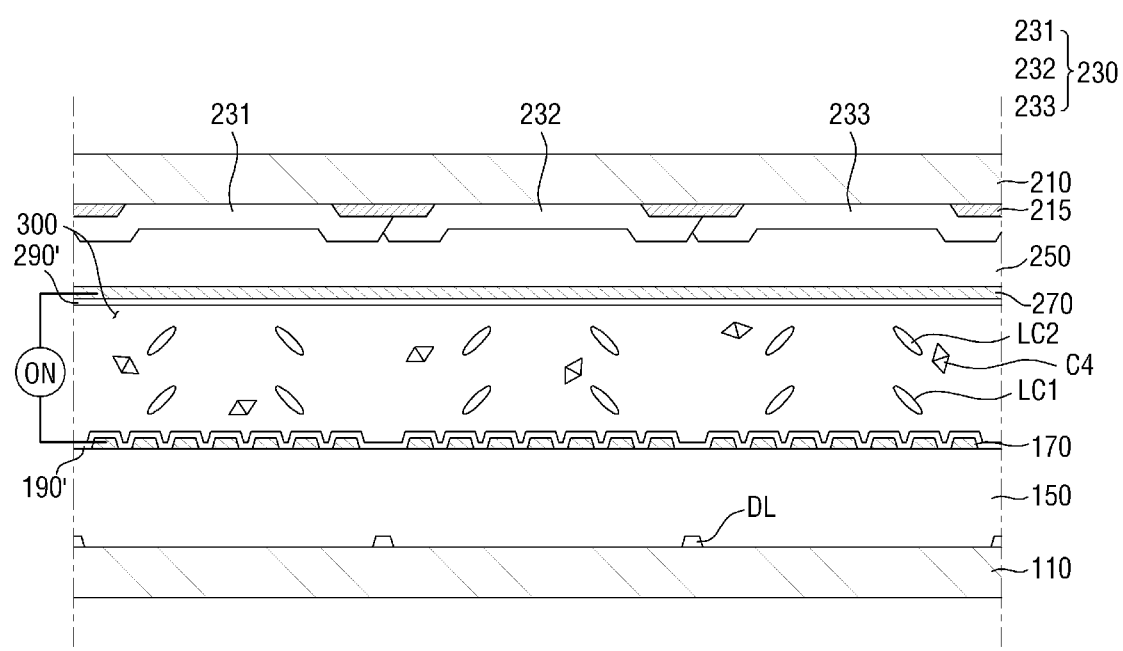

FIG. 14 is an enlarged schematic view of area A in FIG. 13, which is an enlarged schematic view of the first alignment layer 190' in FIG. 13. FIG. 15 is an enlarged schematic view of area B in FIG. 13, which is an enlarged schematic view of the second alignment layer 290' in FIG. 13.

Referring to FIGS. 9 to 15, the first compound C1, the second compound C2, and the third compound C3 may be self-aligned on the surfaces of the first substrate 100' and/or the second substrate 200' to form monomolecular layers (that is, the first alignment layer 190' and the second alignment layer 290'). The major axes of the first compound C1 to the third compound C3 may be aligned in a direction substantially perpendicular to the surface of the first substrate 100' or the second substrate 200', respectively.

For example, the hydrophilic groups contained in the first compound C1 to the third compound C3 in the first alignment layer 190' may be aligned toward the first electrode 170 and/or the intermediate layer 150. Further, in the first alignment layer 190', a polymerizable group bound to the other end of the core structure of the first compound C1, a polymerizable group bound to the other end of the core structure of the second compound C2, and a hydrocarbon moiety bound to the other end of the core structure of the third compound C3 may be aligned toward the liquid crystal layer 300, respectively.

Similarly, the hydrophilic groups contained in the first compound C1 to the third compound C3 in the second alignment layer 290' may be aligned toward the second electrode 270. Further, in the second alignment layer 290', a polymerizable group bound to the other end of the core structure of the first compound C1, a polymerizable group bound to the other end of the core structure of the second compound C2, and a hydrocarbon moiety bound to the other end of the core structure of the third compound C3 may be aligned toward the liquid crystal layer 300, respectively.

The liquid crystals LC in the liquid crystal layer 300 may be induced to be vertically aligned by the first alignment layer 190' and the second alignment layer 290'. Further, the fourth compound C4 having no hydrophilic group may be uniformly mixed with the liquid crystals LC to be kept dispersed in the liquid crystal layer 300.

Subsequently, referring to FIGS. 9 to 16, an electric field is formed in the liquid crystal layer 300 (S150).

When the liquid crystals LC1 and LC2 in the liquid crystal layer 300 have negative dielectric anisotropy and an electric field is formed in the liquid crystal layer 300, the liquid crystals LC1 and LC2 are rearranged in a direction in which the major axes of the liquid crystals LC1 and LC2 intersect the direction of the electric field. For example, the first liquid crystal LC1 adjacent to the first substrate 100' and the second liquid crystal LC2 adjacent to the second substrate 200' may be tilted to have a predetermined angle with respect to a line perpendicular to the surface of the first substrate 100' and the surface of the second substrate 200', respectively, and then may be maintained in its tilted state.

As the first liquid crystal LC1 and the second liquid crystal LC2 are tilted, the major axes of the first compound C1 to third compound C3 in the first alignment layer 190' and the second alignment layer 290' may also be inclined at an angle similar to the slope of the liquid crystals LC1 and LC2. However, the present invention is not limited thereto.

Subsequently, referring to FIGS. 9 to 17, the liquid crystal layer 300 is irradiated with light while the electric field is formed (present)(S160).

The step (S160) of irradiating the liquid crystal layer 300 with light may be a step of forming a polymer P1 by photopolymerization, that is, photopolymerizing the polymerizable monomers in the first alignment layer 190' and the second alignment layer 290'. Specifically, the step (S160) of irradiating the liquid crystal layer 300 with light may include a step of photopolymerizing the first compound C1, the second compound C2, the fourth compound C4, or a combination thereof.

In an exemplary embodiment, the step (S160) of irradiating the liquid crystal layer 300 with light may include a step of irradiating the liquid crystal layer 300 with light having a peak wavelength in a range of about 240 nm to about 260 nm, about 270 nm to about 280 nm, about 330 nm to about 340 nm, or about 360 nm to about 370 nm. The light may be applied from the side of the first substrate 100' which is a lower substrate, from the side of the second substrate 200' which is an upper substrate, or from both directions.

Figure 17:
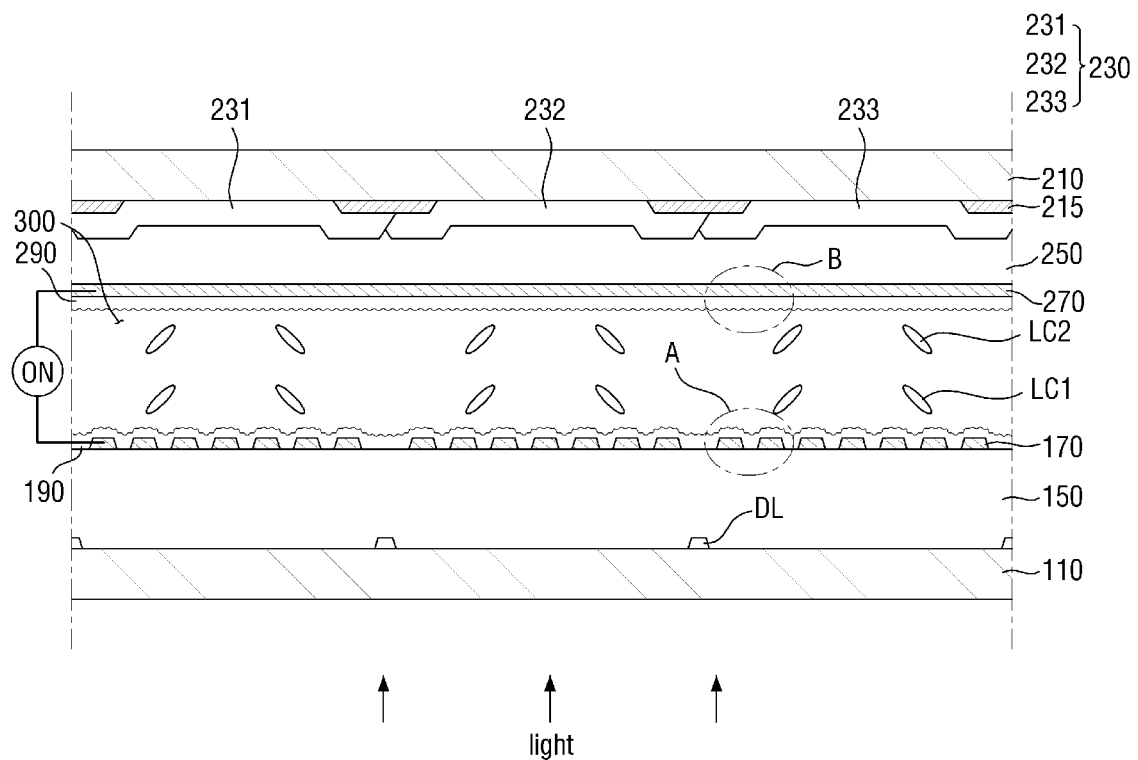
Figure 18:
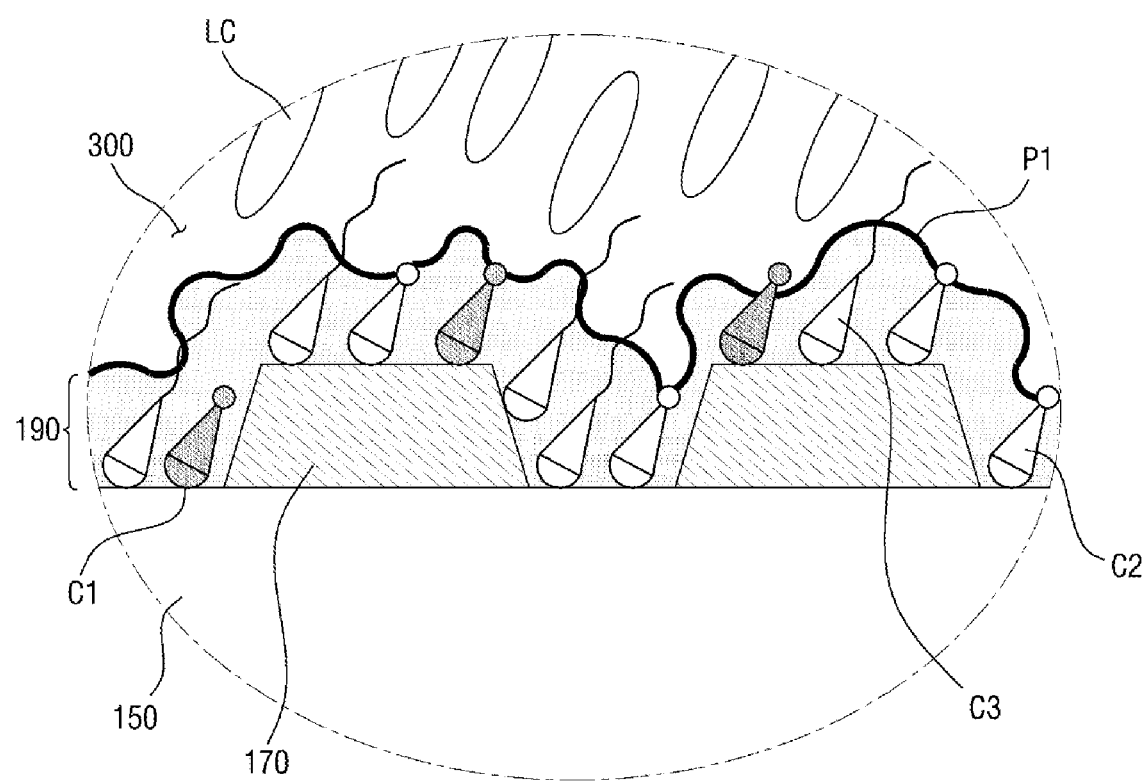
Figure 19:
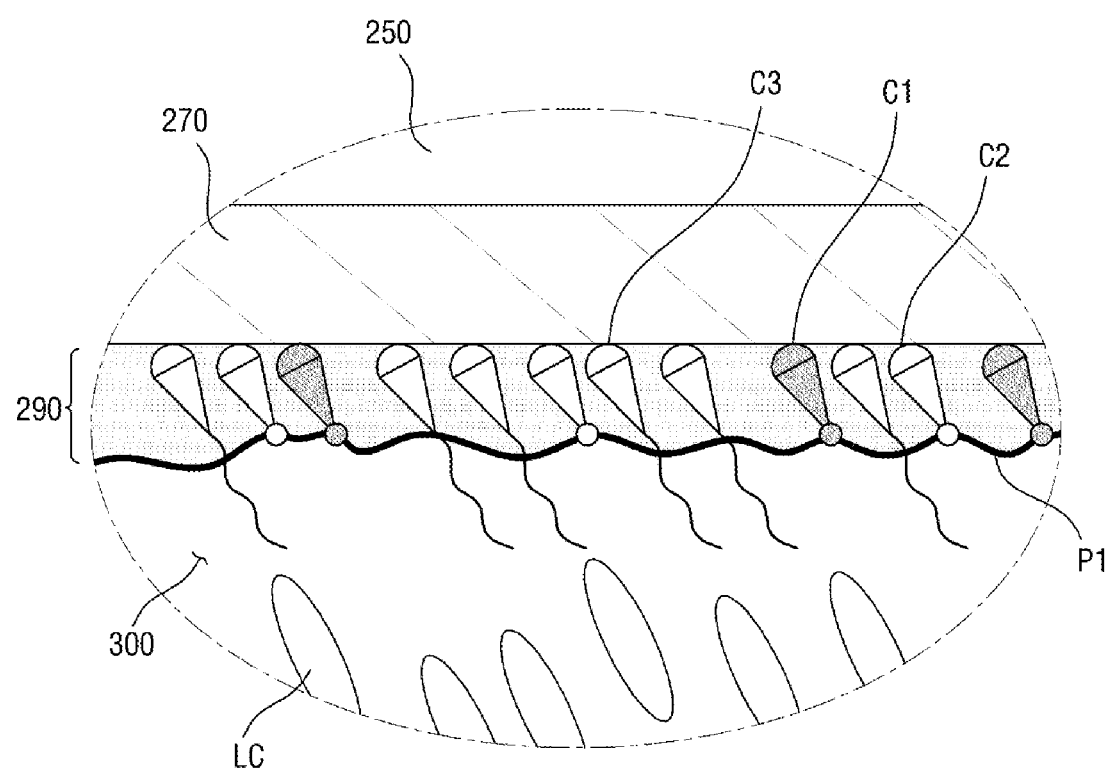

FIG. 18 is an enlarged schematic view of area A in FIG. 17, which is an enlarged schematic view of the first wavelength absorbing layer 190 in FIG. 17. FIG. 19 is an enlarged schematic view of area B in FIG. 17, which is an enlarged schematic view of the second wavelength absorbing layer 290 in FIG. 17.

Referring to FIGS. 9 to 19, when the first alignment layer 190', the second alignment layer 290', and the liquid crystal layer 300 are irradiated with light, the first alignment layer 190' may be formed into the first wavelength absorbing layer 190, and the second alignment layer 290' may be formed into the second wavelength absorbing layer 290.

As described above with reference to FIG. 16, the major axes of the first compound C1 and the second compound C2, which are self-aligned to form a monomolecular layer, may be tilted together with the liquid crystals LC. Therefore, the first compound C1 and the second compound C2 forming the monolayer in the first alignment layer 190' and the second alignment layer 290' are photopolymerized in a tilted state to form the polymer P1.

In the step (S160) of light irradiation, the amount of the fourth compound C4 in the liquid crystal layer 300 may decrease. For example, the fourth compound C4 uniformly dispersed in the liquid crystal layer 300 may be photopolymerized to form the polymer P1 in the first wavelength absorbing layer 190 and the second wavelength absorbing layer 290. That is, the fourth compound C4 may be polymerized together with the first compound C1 and/or the second compound C2 to form the polymer P1. The polymer P1 of the first compound C1, the second compound C2, and the fourth compound C4 can contribute to the formation of the pretilt of the liquid crystals LC in the liquid crystal layer 300.

Through the above-mentioned method, the first wavelength absorbing layer 190 and the second wavelength absorbing layer 290, each containing a first compound C1 having a chromophore or a polymer P1 of the first compound C1, a second compound C2 having no chromophore or a polymer P2 of the second compound C2, a third compound C3 forming a monomolecular layer, or a polymer P1 of a fourth compound C4, may be formed.

Figure 20:
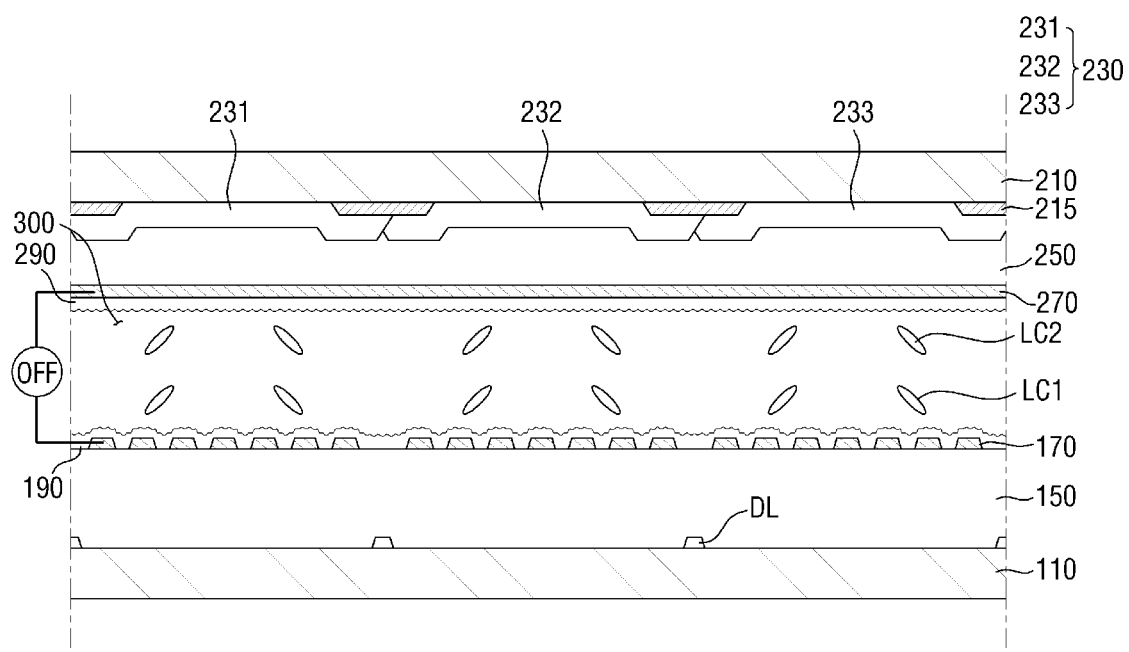

FIG. 20 is a cross-sectional view showing a state in which the oblique directions of the first liquid crystal LC1 and the second liquid crystal LC2 are fixed or stabilized by the first wavelength absorbing layer 190 and the second wavelength absorbing layer 290 to maintain a pretilt angle even when an electric field is released (electric field is "off"). In some embodiments, the pretilt angles of the first liquid crystal LC1 and the second liquid crystal LC2 may be different from each other.

According to the method of manufacturing a liquid crystal display device according to this embodiment, the wavelength absorbing layer containing the first compound C1 having a chromophore or the polymer P1 of the first compound C1 is disposed along a light path from the backlight unit to a viewer, thereby improving color reproducibility.

Further, a monomolecular layer and a polymerized monomolecular layer may be formed by a relatively simple method using the self-alignment properties and/or polymerization properties of the above-mentioned first to third compounds C1 to C3. The first wavelength absorbing layer 190 and the second wavelength absorbing layer 290 formed in this way have excellent alignment ability with respect to the liquid crystals LC, so as to vertically align the liquid crystals LC and impart a pretilt. Therefore, an additional polymer alignment layer, for example, a polyimide alignment layer, which utilizes a high-temperature process, may be omitted, thereby minimizing thermal damage to the components in the display panel due to the high-temperature process.

Hereinafter, a method of manufacturing a liquid crystal display device according to another embodiment of the present invention will be described.

Figure 21:
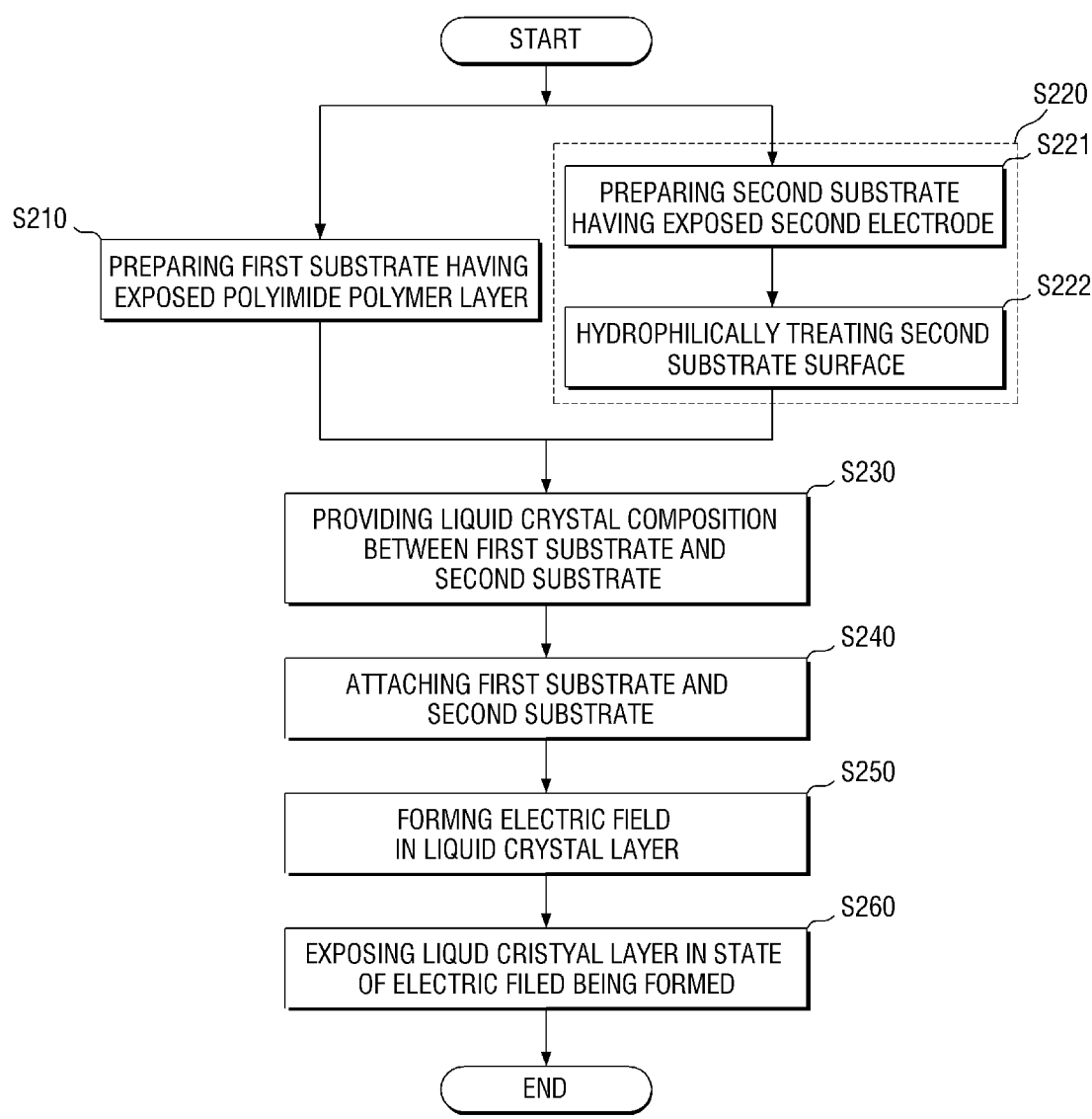
FIG. 21 is a flowchart of a method of manufacturing a liquid crystal display device according to another embodiment of the present invention.

FIG. 21 is a flowchart illustrating a method of manufacturing a liquid crystal display device according to another embodiment of the present invention. FIGS. 22 to 29 are cross-sectional views illustrating the manufacturing method of FIG. 20.

Figure 22:
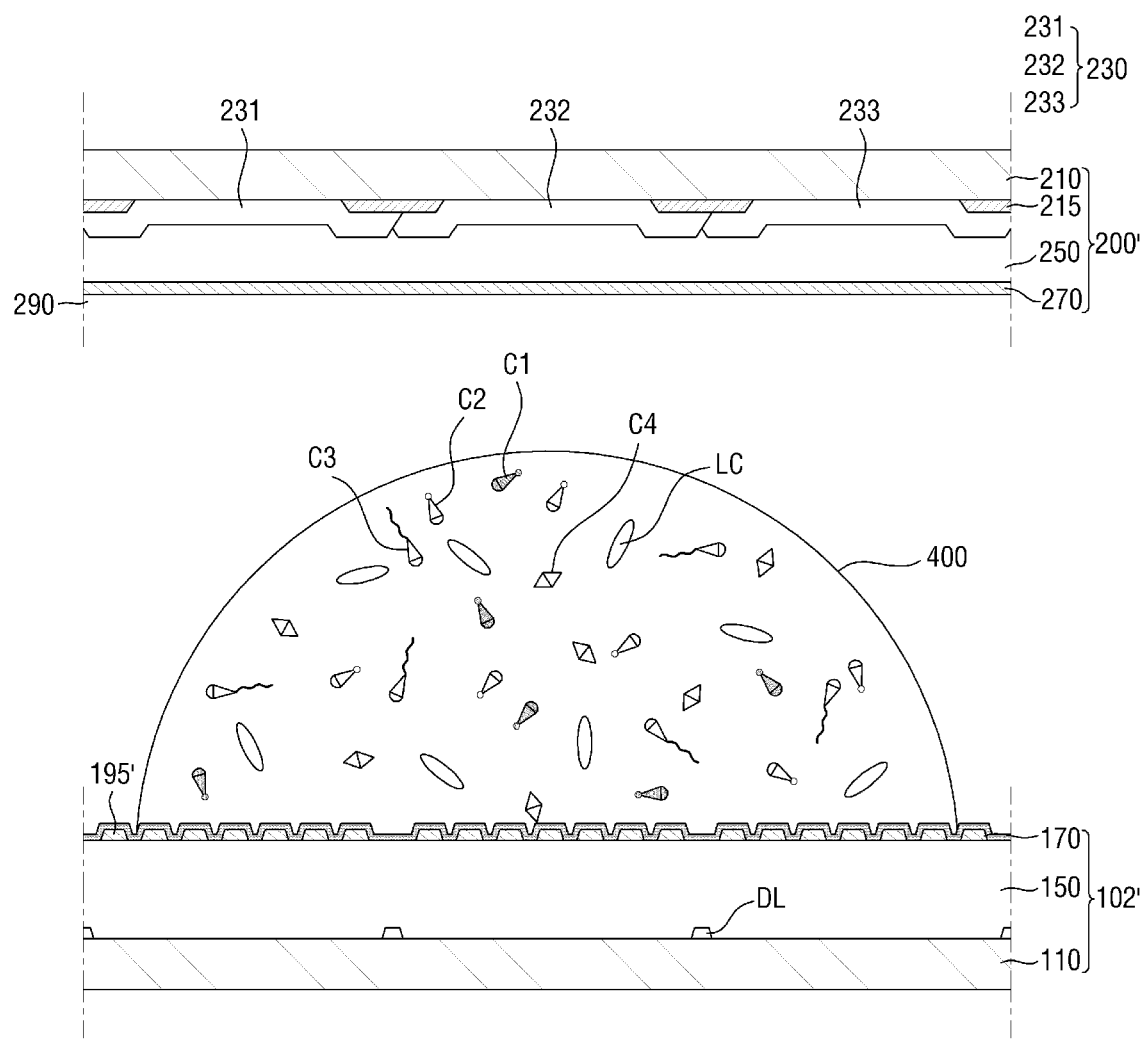
FIGS. 22 to 29 are cross-sectional views illustrating the steps in the manufacturing method of FIG. 21.

First, referring to FIGS. 21 and 22, a first substrate 102' and a second substrate 200' are prepared (S210 and S220), a liquid crystal composition 400 is provided between the first substrate 102' and the second substrate 200' (S230).

In an exemplary embodiment, the step (S210) of preparing (providing) the first substrate 102' may be step of preparing the first substrate 102' including a first base substrate 110, a switching element (not shown), an intermediate layer 150, a first electrode 170, and a polyimide polymer layer 195'.

For example, the polyimide polymer layer 195' may have an imide group as the repeating unit of a main chain and a side chain of a vertical alignment group bound to the main chain. In some embodiments, the polyimide polymer layer 195' may further have a side chain of a photoinitiator group bound to the main chain.

The polyimide polymer layer 195' may be disposed on the first electrode 170, and may be in contact with the first electrode 170 and the intermediate layer 150, respectively. That is, the first electrode 170 and the intermediate layer 150 may be covered by the polyimide polymer layer 195'.

Meanwhile, since the step of preparing the second substrate 200', whose surface has been subjected to hydrophilic treatment, has been described with reference to FIG. 11, a redundant description will be omitted.

The liquid crystal composition 400 may include liquid crystals LC and a first compound C1. The first compound may include a core structure, and at least one hydrophilic group bound to an end of the core structure, and the at least one hydrophilic group may include a chromophore. In some embodiments, the liquid crystal composition 400 may include at least one of a second compound C2 including a core structure, at least one hydrophilic group bound to one end of the core structure, and a polymerizable group bound to the other end of the core structure, a third compound C3 including a core structure, at least one hydrophilic group bound to an end of the core structure, and an aliphatic or aromatic hydrocarbon moiety bound to the other end of the core structure, and a fourth compound C4 including a core structure and a polymerizable group bound to an end of the core structure and a polymerizable group bound to the other end of the core structure.

In an exemplary embodiment, the step (S230) of providing the liquid crystal composition 400 may be a step of providing the liquid crystal composition 400 such that the polyimide polymer layer 195' exposed at the surface of the first substrate 102' is brought into contact with the liquid crystal composition 400. FIG. 22 illustrates a case where the liquid crystal composition 400 is dropped onto the surface of the first substrate 102'. Alternatively, in another embodiment, the liquid crystal composition 400 may be dropped onto the surface of the second substrate 200'. In this case, the liquid crystal composition 400 may be in contact with the surface of the second electrode 270 exposed at the surface of the second substrate 200', and in step (S240) of forming the liquid crystal layer 300 (to be described later), the liquid crystal composition 400 may be in contact with the polyimide polymer layer 195' exposed at the surface of the first substrate 102'.

Subsequently, referring to FIGS. 21 to 23, the first substrate 102' and the second substrate 200' are attached to each other with a liquid crystal layer 300 formed therebetween (S240). In an exemplary embodiment, the liquid crystal layer 300 may be formed between the first substrate 102' and the second substrate 200', and then phase separation may occur between the first compound C1, the second compound C2, the third compound C3, and the liquid crystals LC in the liquid crystal layer 300. For example, at least some of the first compound C1 to the third compound C3 are aligned on the surface of the second substrate 200' so as to form a second alignment layer 290'.

Hereinafter, the polyimide polymer layer 195' and the second alignment layer 290' in the step (S240) of forming the liquid crystal layer 300 will be described in more detail with reference to FIGS. 24 and 25.

Figure 23:
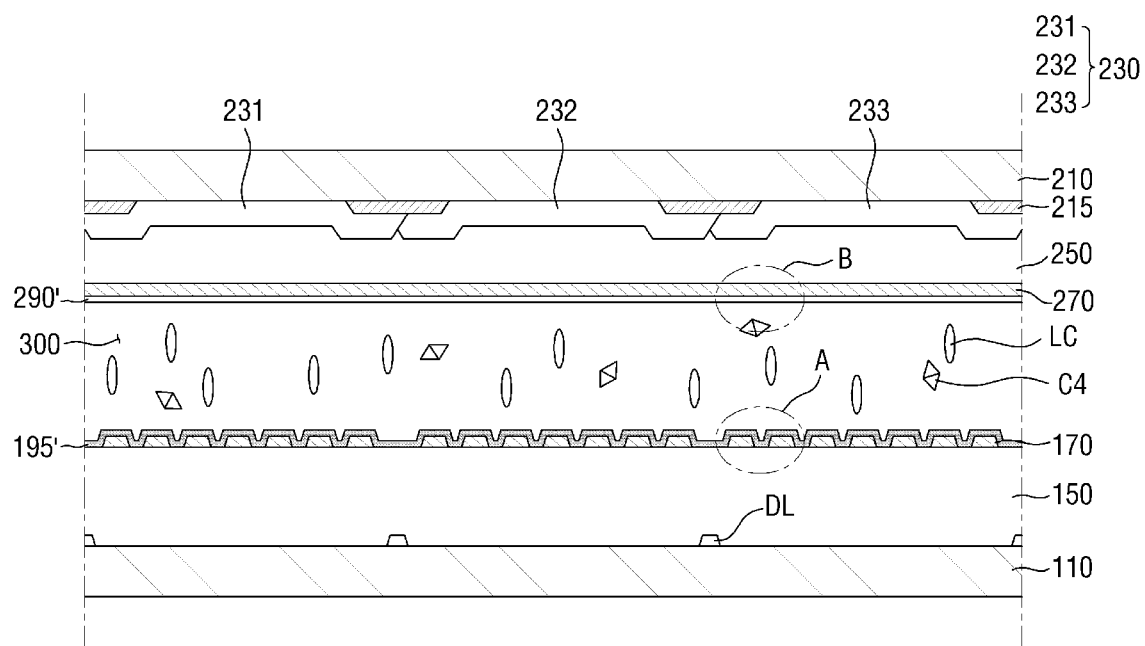
Figure 24:
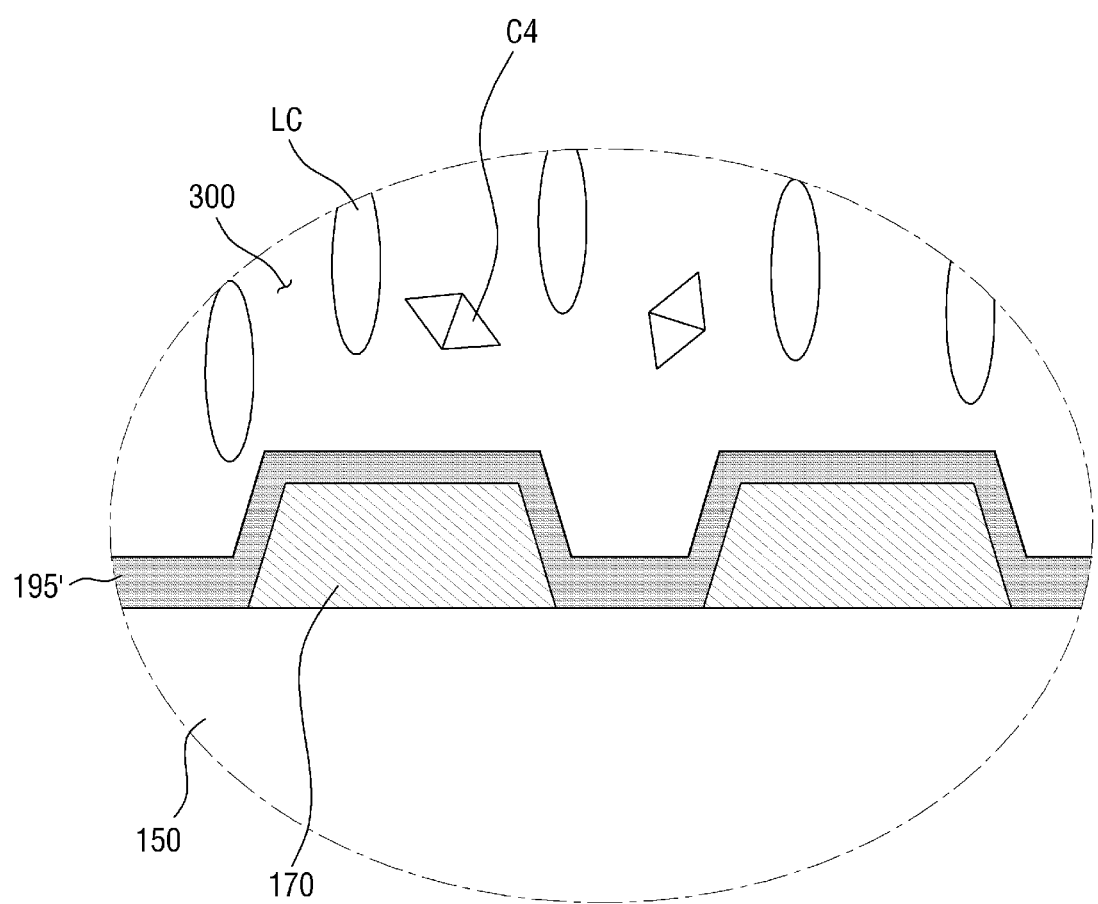
Figure 25:
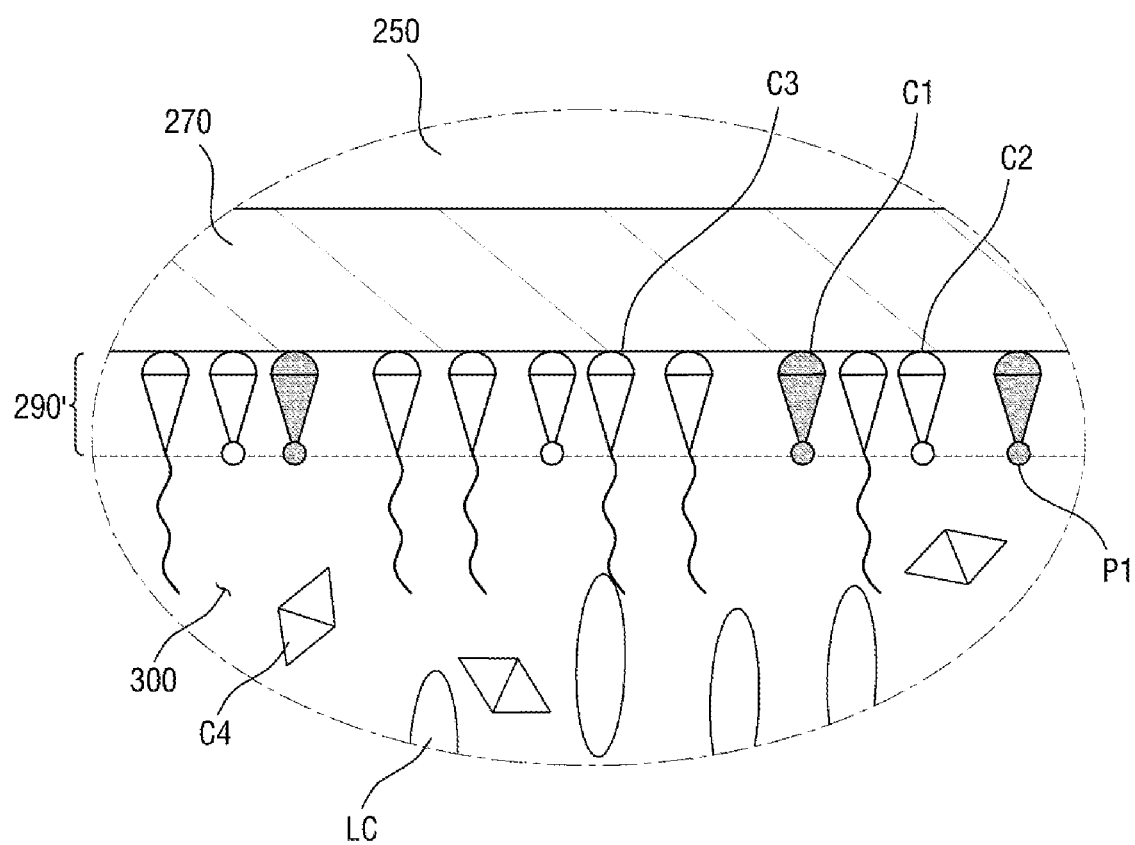
Figure 26:
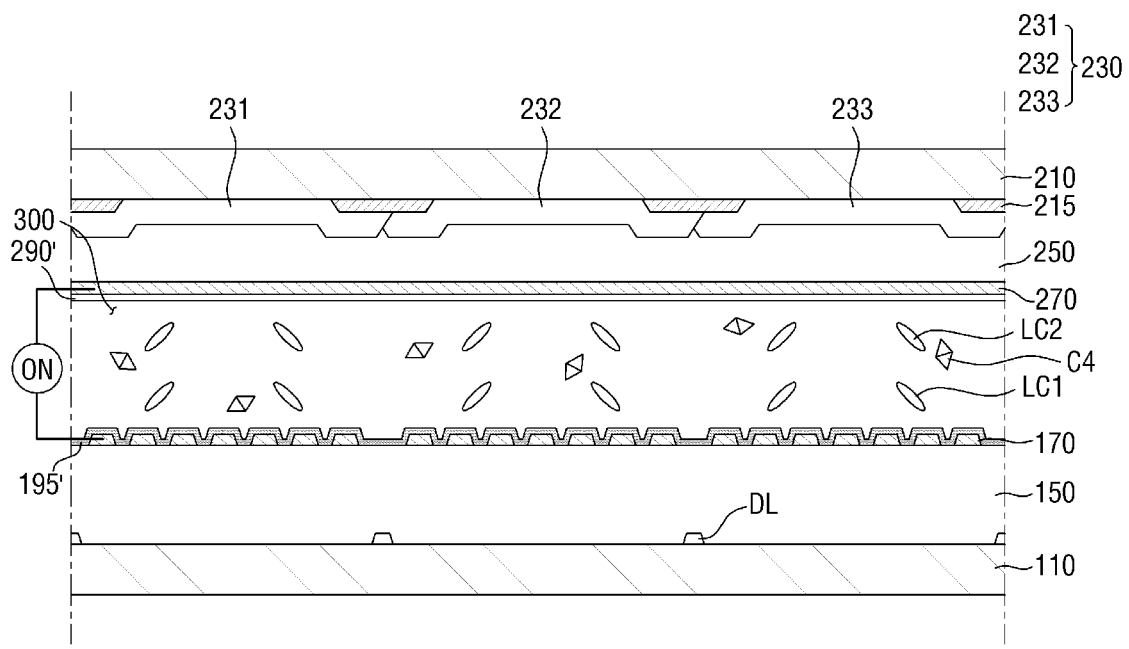

FIG. 24 is an enlarged schematic view of area A in FIG. 23, which is an enlarged schematic view of the polyimide polymer layer 195' in FIG. 23. FIG. 25 is an enlarged schematic view of area B in FIG. 23, which is an enlarged schematic view of the second alignment layer 290' in FIG. 23.

Referring to FIGS. 21 to 25, the first compound C1, the second compound C2, and the third compound C3 may be self-aligned on the surface of the second substrate 200' to form a monomolecular layer (that is, the second alignment layer 290'). The major axes of the first compound C1 to the third compound C3 may be aligned in a direction substantially perpendicular to the surface of the second substrate 200', respectively.

The surface of the polyimide polymer layer 195' may have fewer functional groups capable of hydrogen bonding than the surface of the second electrode 270. Accordingly, the first compound (C1), the second compound (C2), and the third compound (C3) are chemically more selective for the second electrode (270) than the polyimide polymer layer 195' to form the second alignment layer 290', such that a self-aligned alignment layer may not be formed on the surface of the polyimide polymer layer 195', or a sufficient degree of alignment layer may not be formed.

Subsequently, referring to FIGS. 21 to 26, an electric field is formed (generated) in the liquid crystal layer 300 (S250). Since the step (S250) of forming an electric field in the liquid crystal layer 300 has been described with reference to FIG. 16, a redundant description will be omitted.

Subsequently, referring to FIGS. 21 to 27, the liquid crystal layer 300 is irradiated with light in a state where an electric filed is present (formed) (S260).

The step (S260) of irradiating the liquid crystal layer 300 with light may be a step of forming a polymer P1 by photopolymerizing the polymerizable monomers in the first alignment layer 195'. Further, this step (S260) may be a step of forming polymers P1 and P2 by photopolymerizing the polymerizable monomers in the liquid crystal layer 300. Specifically, the step (S260) of irradiating the liquid crystal layer 300 with light may include a step of photopolymerizing the first compound C1, the second compound C2, the fourth compound C4, or a combination thereof.

Figure 27:
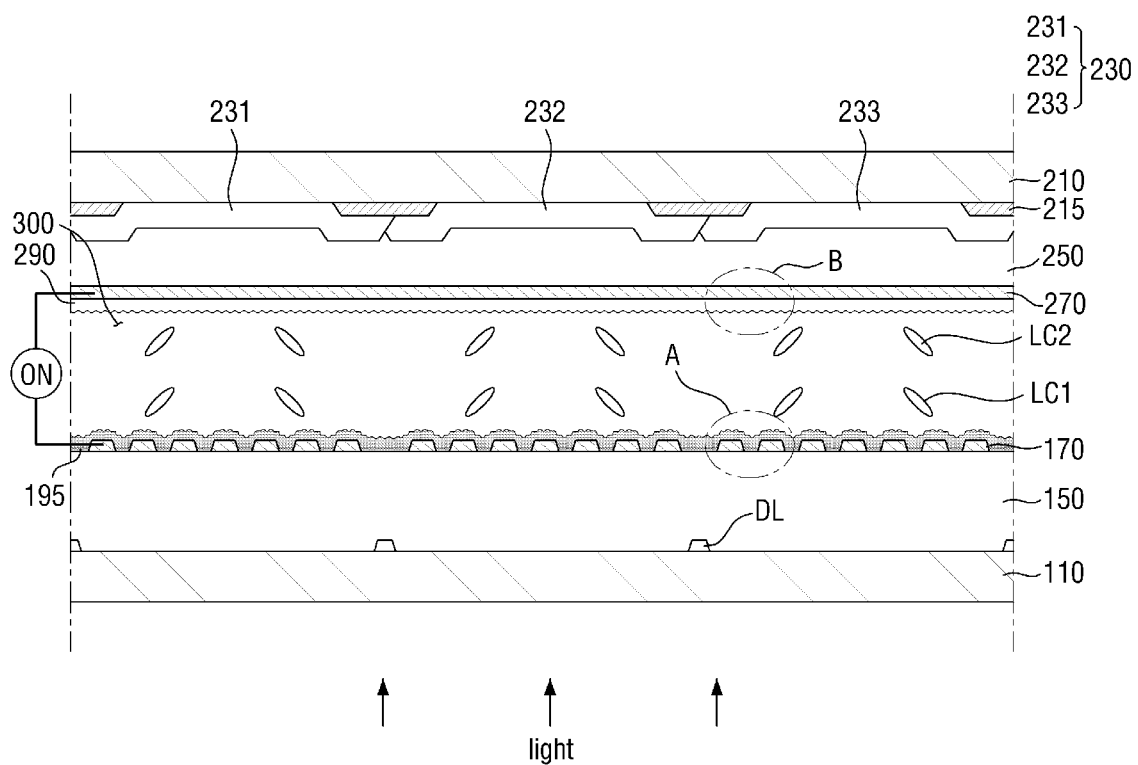
Figure 28:
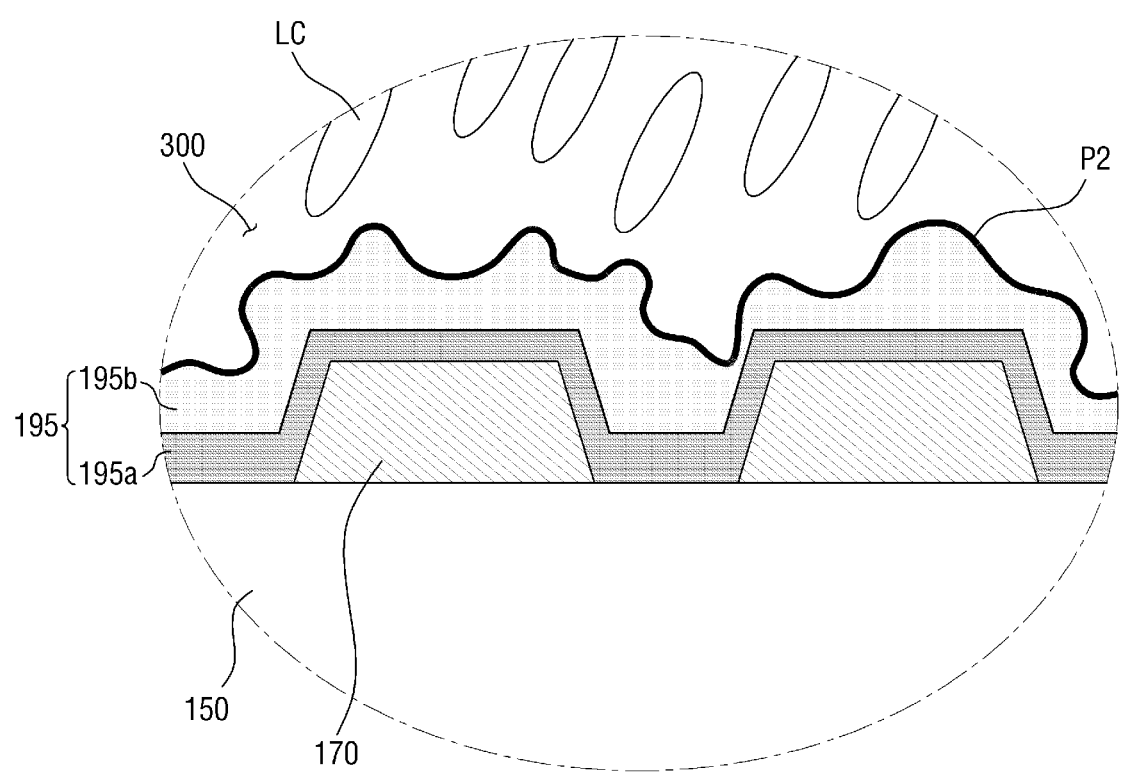
Figure 29:
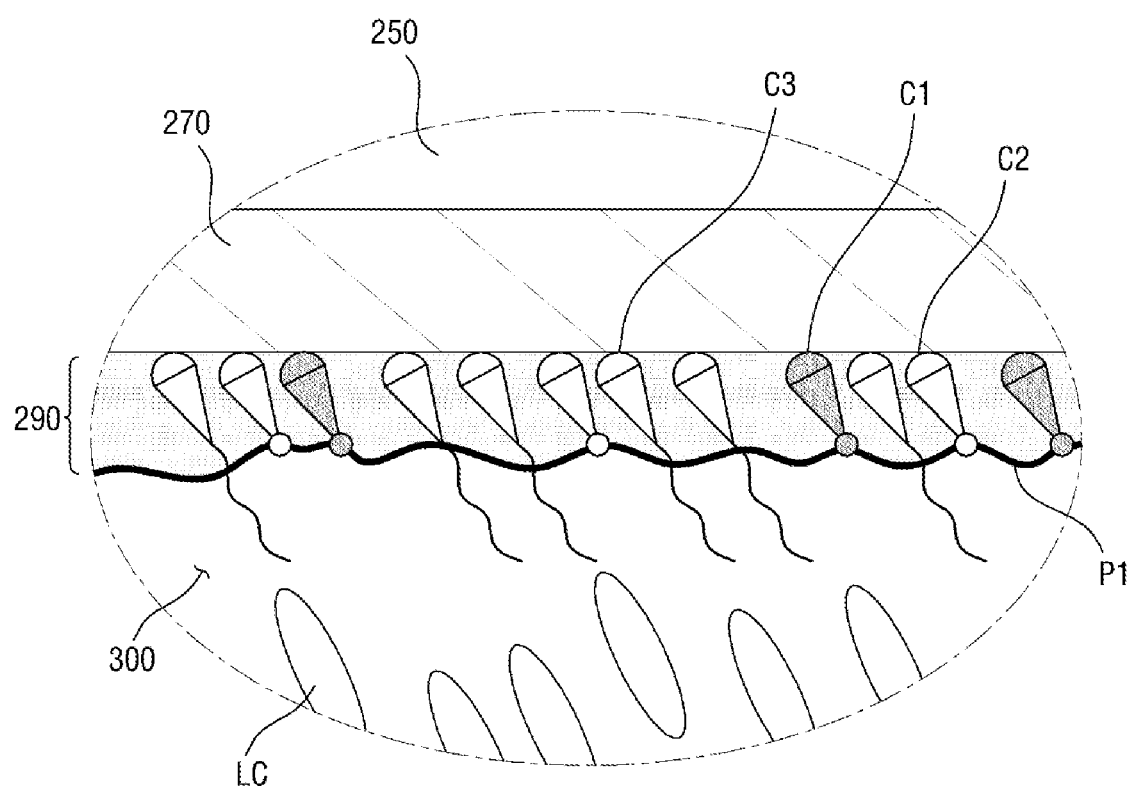

FIG. 28 is an enlarged schematic view of area A in FIG. 27, which is an enlarged schematic view of the liquid crystal alignment layer 195 in FIG. 27. FIG. 29 is an enlarged schematic view of area B in FIG. 27, which is an enlarged schematic view of the second wavelength absorbing layer 290 in FIG. 27.

Referring to FIGS. 21 to 29, when the polyimide polymer layer 195', the second alignment layer 290', and the liquid crystal layer 300 are irradiated with light, the polyimide polymer layer 195' may be formed into the polyimide liquid crystal alignment layer 195, and the second alignment layer 290' may be formed into the second wavelength absorbing layer 290.

As described above, the major axes of the first compound C1 and the second compound C2 are self-aligned to form a monomolecular layer, and may be inclined (tilted) together with the liquid crystals LC. Therefore, the first compound C1 and the second compound C2 forming the monolayer in the second alignment layer 290' are photopolymerized in a tilted state to form the polymer P1.

In the step (S260) of light irradiation, the fourth compound C4 uniformly dispersed in the liquid crystal layer 300 may be photopolymerized to form the polymers P1 and P2 in the liquid crystal alignment layer 195 and the second wavelength absorbing layer 290.

Although not shown in the drawings, in some embodiments, the method may further include a step of bending the first substrate 102' and the second substrate 200'. In this case, this step of bending the first substrate 102' and the second substrate 200' may include a step of bending the first substrate 102' such that a side of the first substrate 102' facing the second substrate 200' is concave and a step of bending the second substrate 200' such that a side of the second substrate 200' facing the first substrate 102' is convex.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A liquid crystal display device, comprising:
a first base substrate;
a first electric field generating electrode disposed on the first base substrate;
a liquid crystal layer disposed on the first electric field generating electrode and comprising liquid crystals; and a first wavelength absorbing layer disposed between the first electric field generating electrode and the liquid crystal layer, and configured to absorb a portion of an incident light wavelength, wherein the first wavelength absorbing layer comprises a first compound or a polymer of the first compound, wherein the first compound comprises
- a core structure,
- at least one hydrophilic group bound to an end of the core structure, and
- a polymerizable group bound to the other end of the core structure, wherein the core structure comprises a quinizarin represented by Chemical Formula 3 below or an azo-naphthol chromophore represented by Chemical Formula 4 below, Chemical Formula 3

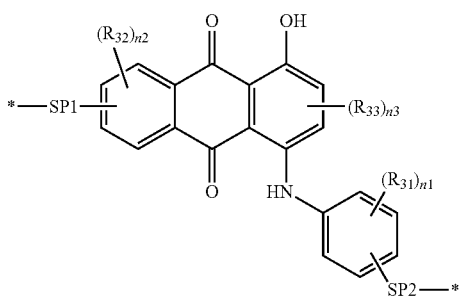

<Chemical Formula 4>

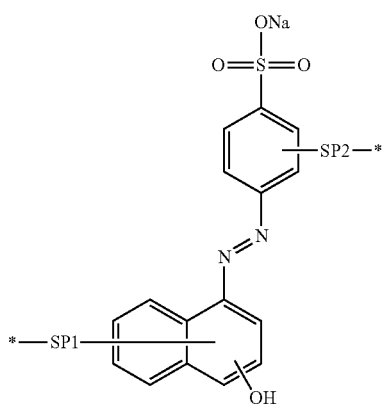

wherein, in Chemical Formula 3, $R_{31}$ is a methyl group or an ethyl group, $R_{32}$ and $R_{33}$ are each independently a phenyl group, n1 is an integer of 0 to 5, n2 is an integer of 0 to 3, and n3 is an integer of 0 to 2; and in Chemical Formulas 3 and 4, SP1 and SP2 are each independently a single bond or a $C_1$-$C_{12}$ alkylene group; and wherein the hydrophilic group is represented by Chemical Formula 2:

Chemical Formula 2

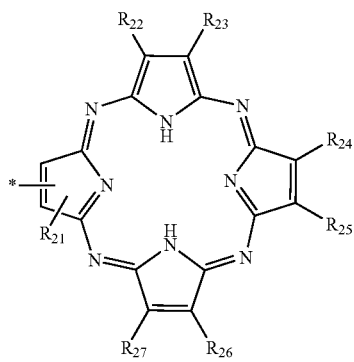

wherein, $R_{21}$ to $R_{27}$ are each independently a hydrogen atom, a methyl group, or an ethyl group.

2. The liquid crystal display device of claim 1,
wherein the first wavelength absorbing layer is in contact with the liquid crystal layer and the first electric field generating electrode, and
the first wavelength absorbing layer is configured to induce initial alignment of the liquid crystals.

3. The liquid crystal display device of claim 1,
wherein
the first wavelength absorbing layer has an absorption peak wavelength in a range of about 580 nanometers to about 600 nanometers or in a range of about 490 nanometers to about 510 nanometers.

4. The liquid crystal display device of claim 3,
wherein
the first wavelength absorbing layer has an absorption peak wavelength in a range of about 580 nanometers to about 600 nanometers or in a range of about 475 nanometers to about 490 nanometers.

5. The liquid crystal display device of claim 1,
wherein the first wavelength absorbing layer further comprises:
a second compound comprising a core structure, at least one hydrophilic group bound to an end of the core structure, and a polymerizable group bound to the other end of the core structure;
a polymer of the second compound;
a third compound comprising a core structure, at least one hydrophilic group bound to an end of the core structure, and an aliphatic or aromatic hydrocarbon moiety bound to the other end of the core structure; or
a polymer of a fourth compound comprising a core structure, a polymerizable group bound to one end of the core structure, and a polymerizable group bound to the other end of the core structure.

6. The liquid crystal display device of claim 5,
wherein the hydrophilic group of each of the first compound, the second compound, and the third compound is aligned toward the first electric field generating electrode, and
the first wavelength absorbing layer is configured to induce vertical alignment of the liquid crystals in the liquid crystal layer.

7. The liquid crystal display device of claim 1, further comprising:
a second base substrate disposed on the liquid crystal layer;
a second electric field generating electrode disposed between the second base substrate and the liquid crystal layer and configured to form an electric field together with the first electric field generating electrode; and a second wavelength absorbing layer disposed between the second electric field generating electrode and the liquid crystal layer, and in contact with the second electric field generating electrode and the liquid crystal layer, wherein the second wavelength absorbing layer is configured to absorb substantially a same incident light wavelength as the first wavelength absorbing layer.

8. The liquid crystal display device of claim 1, further comprising:
   a second base substrate disposed on the liquid crystal layer;
   a second electric field generating electrode disposed between the second base substrate and the liquid crystal layer, and configured to form an electric field together with the first electric field generating electrode; and
   a liquid crystal alignment layer disposed between the second electric field generating electrode and the liquid crystal layer, and in contact with the second electric field generating electrode and the liquid crystal layer, wherein the liquid crystal alignment layer comprises a polyimide polymer,
   wherein a side of the second base substrate facing the first base substrate is concave.

9. The liquid crystal display device of claim 8,
   wherein a surface roughness of the first wavelength absorbing layer is lower than a surface roughness of the liquid crystal alignment layer.

10. The liquid crystal display device of claim 1, further comprising:
    a backlight unit configured to provide light,
    wherein light provided from the backlight unit and incident on the first wavelength absorbing layer comprises light having a peak wavelength in a wavelength band of about 430 nanometers to about 480 nanometers, light having a peak wavelength in a wavelength band of about 530 nanometers to about 570 nanometers, and light having a peak wavelength in a wavelength band of about 610 nanometers to about 650 nanometers.

11. The liquid crystal display device of claim 10, further comprising:
    a color conversion pattern layer disposed between the first base substrate and the first electric field generating electrode,
    wherein the color conversion pattern layer has a transmission wavelength band which overlaps a peak wavelength of the portion of the incident light absorbed by the first wavelength absorbing layer.

12. A method of manufacturing a liquid crystal display device, comprising:
    providing a first substrate comprising a first base substrate and a first electric field generating electrode disposed on the first base substrate;
    providing a second substrate including a second base substrate and a second electric field generating electrode disposed on the second base substrate; and
    providing a liquid crystal composition to form a liquid crystal layer between the first substrate and the second substrate,
    wherein the liquid crystal composition comprises liquid crystals and a first compound, and
    wherein the first compound comprises
    a core structure,
    at least one hydrophilic group bound to an end of the core structure, and
    a polymerizable group bound to the other end of the core structure, wherein the core structure comprises a quinizarin represented by Chemical Formula 3 below or an azo-naphthol chromophore represented by Chemical Formula 4 below, Chemical Formula 3

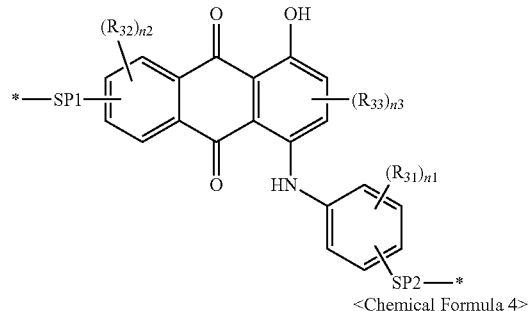

<Chemical Formula 4>

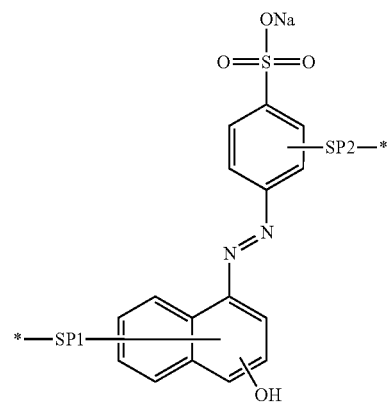

wherein, in Chemical Formula 3, R31 is a methyl group or an ethyl group, R32 and R33 are each independently a phenyl group, n1 is an integer of 0 to 5, n2 is an integer of 0 to 3, and n3 is an integer of 0 to 2; and in Chemical Formulas 3 and 4, SP1 and SP2 are each independently a single bond or a C1-C12 alkylene group; and wherein the hydrophilic group is represented by Chemical Formula 2:

Chemical Formula 2

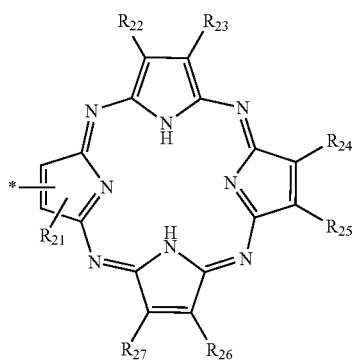

wherein, R21 to R27 are each independently a hydrogen atom, a methyl group, or an ethyl group.

13. The method of claim 12,
wherein the liquid crystal composition further comprises:
a second compound comprising at least one hydrophilic group bound to an end of a core structure and a polymerizable group bound to the other end of the core structure;
a third compound comprising at least one hydrophilic group bound to an end of a core structure and an aliphatic or aromatic hydrocarbon moiety bound to the other end of the core structure; or
a fourth compound comprising a polymerizable group bound to an end of a core structure and a polymerizable group bound to the other end of the core structure.

14. The method of claim 13,
wherein the providing of the liquid crystal composition comprises contacting the liquid crystal composition with the first electric field generating electrode and the second electric field generating electrode.

15. The method of claim 13, further comprising:
bending the second substrate such that a side of the second substrate facing the first substrate is concave,
wherein the second substrate further comprises a polymer layer disposed on the second electric field generating electrode and the polymer layer comprise a polyimide polymer, and
the providing of the liquid crystal composition comprises contacting the liquid crystal composition with the first electric field generating electrode and the polymer layer.

16. The method of claim 13,
wherein the providing of the liquid crystal composition to form the liquid crystal layer comprises:
aligning at least a portion of the first compound, a portion of the second compound, and a portion of the third compound on a surface of the first field generating electrode to form a first alignment layer;
aligning at least a portion of the first compound, a portion of the second compound, and a portion of the third compound on a surface of the second field generating electrode to form a second alignment layer; and
forming the liquid crystal layer comprising liquid crystals vertically aligned by the first alignment layer and the second alignment layer.

17. The method of claim 16, further comprising;
forming an electric field in the liquid crystal layer;
irradiating light to the liquid crystal layer while the electric field is present; and
polymerizing at least a portion of the first compound, a portion of the second compound, and a portion of the fourth compound.

* * * * *